United States Patent
Zhang et al.

(10) Patent No.: US 11,006,490 B2
(45) Date of Patent: May 11, 2021

(54) ELECTRONIC BALLAST INTERFACE CIRCUIT

(71) Applicant: SIGNIFY HOLDING B.V., Eindhoven (NL)

(72) Inventors: Xianhui Zhang, Shanghai (CN); Derek Zheng, Eindhoven (NL); Zhi Quan Chen, Shanghai (CN); Huojun Long, Shanghai (CN); Wen Ran, Eindhoven (NL); Haimin Tao, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/488,669

(22) PCT Filed: Mar. 1, 2018

(86) PCT No.: PCT/EP2018/055030
§ 371 (c)(1),
(2) Date: Aug. 26, 2019

(87) PCT Pub. No.: WO2018/162314
PCT Pub. Date: Sep. 13, 2018

(65) Prior Publication Data
US 2020/0068678 A1    Feb. 27, 2020

(30) Foreign Application Priority Data

Mar. 8, 2017 (WO) ............... PCT/CN2017/076001
Apr. 20, 2017 (EP) ................................ 17167309

(51) Int. Cl.
*H05B 45/10* (2020.01)
*H05B 45/37* (2020.01)
*H02M 1/14* (2006.01)

(52) U.S. Cl.
CPC ............... *H05B 45/10* (2020.01); *H02M 1/14* (2013.01); *H05B 45/37* (2020.01)

(58) Field of Classification Search
None
See application file for complete search history.

(56) References Cited

U.S. PATENT DOCUMENTS

| | | | |
|---|---|---|---|
| 2009/0303720 A1 | 12/2009 | McGrath | |
| 2013/0320869 A1 | 12/2013 | Jans et al. | |
| 2014/0265900 A1 | 9/2014 | Sadwich et al. | |
| 2014/0265935 A1* | 9/2014 | Sadwick | H05B 45/10 315/307 |
| 2014/0320007 A1* | 10/2014 | Stamm | H05B 45/44 315/51 |
| 2015/0181667 A1 | 6/2015 | Tao et al. | |
| 2017/0339765 A1* | 11/2017 | Barnetson | H05B 45/395 |

FOREIGN PATENT DOCUMENTS

| | | |
|---|---|---|
| GB | 2541537 A | 2/2017 |
| WO | 2015066566 A1 | 5/2015 |

* cited by examiner

*Primary Examiner* — Amy Cohen Johnson
*Assistant Examiner* — Jianzi Chen
(74) *Attorney, Agent, or Firm* — Daniel J. Piotrowski

(57) ABSTRACT

There is proposed an interface circuit for connecting an electronic ballast to a lighting arrangement, in which control of a coupling configuration of the interface circuit is dependent upon a frequency of the electronic ballast. In particular, a coupling configuration of the interface circuit is controlled by a control arrangement based on the ballast frequency.

13 Claims, 11 Drawing Sheets

ELECTRONIC BALLAST INTERFACE CIRCUIT

CROSS-REFERENCE TO PRIOR APPLICATIONS

This application is the U.S. National Phase application under 35 U.S.C. § 371 of International Application No. PCT/EP2018/055030, filed on Mar. 1, 2018, which claims the benefit of Chinese Patent Application No. PCT/CN2017/076001, filed Mar. 8, 2017 and European Patent Application No. 17167309.8, filed on Apr. 20, 2017. These applications are hereby incorporated by reference herein.

FIELD OF THE INVENTION

This invention relates to the field of interface circuits, and in particular to interface circuits for electronic ballasts.

BACKGROUND OF THE INVENTION

Tube lighting arrangements are commonly used to light industrial or domestic buildings. Typically, such tube lighting arrangements comprise fluorescent tubes comprising mercury, where current flowing through the fluorescent tube causes the tube to emit light.

Some tube lighting arrangements comprise an electronic ballast adapted to provide an alternating current to the fluorescent tube. In particular, the electronic ballast regulates the current flowing through the fluorescent tube to ensure that a runaway current does not cause damage to the fluorescent lamp. Commonly, such electronic ballasts output a high-frequency alternating current, which increases the efficiency of the tube lighting arrangement.

Recently, it has been increasingly desirable to replace fluorescent tubes with an LED arrangement. This may be for reasons such as increased lifespan, greater efficiency and reduced used of potentially hazardous materials (such as mercury). Accordingly, there is a need for arrangements which may convert an output of the electronic ballast into a form suitable for the LED arrangement.

In the simplest case an LED string can be connected to the electronic ballast with the help of a diode bridge for converting high frequency AC power to DC and a capacitor for smoothing out the ripple current. If the LED string voltage is chosen substantially close to the burning voltage of the fluorescent tube, the LED string will receive a similar power and current as the fluorescent tube.

A further demand is dimming the LED arrangement. This is presently done by a shunt switch that bypasses the LED arrangement from the ballast. In particular, and to make the ballast work smoothly, this shunt switch short-circuits the output of the ballast for a period of time during each cycle of the alternating current provided by the ballast. By varying how long the shunt switch short-circuits the output of the ballast during each cycle, the duty cycle of the power supplied to the LED arrangement can be controlled, enabling control of the output intensity of the LED arrangements (i.e. dimming control).

US20150181667A1 discloses a driver circuit between fluorescent ballast and LED. It has a shunt switch 21, wherein a controller 31 takes care of a synchronization of the switching frequency of the switch 21 and the switching frequency of the fluorescent ballast.

SUMMARY OF THE INVENTION

As described herein, the frequency of the shunt switch is preferably synchronized with the frequency of the ballast output, so that in each period of the ballast output, one constant portion is shunted, and thus the dimming can be stable. Otherwise the control loop may become open and the control is lost.

However, different electronic ballasts have different working frequencies. Presently, a universal shunt switch can only be provided for a variety of ballasts if their working frequencies are similar. However, if the shunt switch is to be compatible with a greater number of ballasts, especially if their working frequencies do not overlap, there is a great challenge. For example, for a first electronic ballast with a working frequency of 500 KHz, the period of one half-cycle of the AC output is 10 µs. In providing a 50% dimming, the duration of the shunt switch is for example 5 µs. But if the first electronic ballast is exchanged with a second ballast having a working frequency of 400 Khz, the period of the output half-cycle is 12.5 µs, this same shunt of 5 µs takes only 40% of 12.5 µs. Thus, the duty cycle of the second electronic ballast is less than the duty cycle of the first electronic ballast, and the output intensity of the LED arrangement would not be similar or the same for both electronic ballasts.

Moreover, a single ballast may have large scope of working frequency. Its output frequency in normal operation mode may be different to its output frequency in deep dimming or standby mode. There is therefore a great challenge in using one shunt switch to support the ballast in both normal operation mode and standby mode.

One idea of the proposed embodiments of the invention is that of controlling the shunt switch or to match the potentially variable frequency of the electronic ballast. If the frequency of the electronic ballast is high, the shunt switch is also controlled to be high so as to be synchronized with the AC output of the electronic ballast in providing the desired duty cycle.

The invention is defined by the claims.

According to examples in accordance with an aspect of the invention, there is provided an interface circuit for coupling an electronic ballast, which ballast is adapted to output an alternating power supply, to a lighting arrangement, the interface circuit comprising: an input terminal connectable to the electronic ballast; an output terminal connectable to the lighting arrangement; a shunt arrangement adapted to controllably adjust a coupling configuration between the input terminal and the output terminal; a detection arrangement adapted to generate a control signal corresponding to a frequency of the alternating power supply received at the input terminal; and a control arrangement adapted to, during each cycle of the alternating power supply, control the coupling configuration of the shunt arrangement based on the control signal, wherein the control arrangement is adapted to control the duration of a coupling configuration provided by the shunt arrangement during each cycle of the alternating power supply based on the control signal, so as to control a duty cycle of the alternating power supply provided to the output terminal or a duty cycle of not short circuiting the electronic ballast based on the control signal.

The interface circuit or module is connectable between an electronic ballast and a lighting arrangement (e.g. an LED lighting arrangement). The circuit is adapted to controllably connect and disconnect the electronic ballast from the lighting arrangement based on at least a detected frequency of an alternating power supply provided by the electronic ballast. In other words, a coupling configuration between the electronic ballast and the lighting arrangement may be controlled.

To this end, a detection or sensing arrangement is provided to generate a control signal corresponding to the frequency of alternating power supply provided by the electronic ballast (i.e. a ballast frequency). A control arrangement controls a shunt arrangement based on the control signal.

The shunt arrangement defines a coupling configuration between the input interface and the output interface. A coupling configuration defines whether current may flow from the input interface to the output interface (and through the lighting arrangement) or not. Thus, the shunt arrangement may bypass a load, i.e. the lighting arrangement, connected to the output arrangement, and provide an alternative path for current provided by the electronic ballast. This may, for example, be performed by shorting nodes of the input terminal, or coupling the input/output terminal to a ground or reference voltage. The shunt arrangement may thereby controllably shunt the alternating power supply provided by the electronic ballast away from the output terminal.

Put simply, the interface circuit is adapted to shunt an alternating power supply provided to an input terminal (by an electronic ballast) based on a signal corresponding to a frequency of the alternating power supply. Then the shunting can match the ballast output frequency. The control signal corresponding to the frequency of the alternating power supply is not necessary a numeric value indicative to the frequency value, but could be a simple signal corresponding to a high or low state of the frequency of the alternating power supply which will be described later.

This interface circuit may allow a lighting arrangement to be connected to a wider range of electronic ballasts, in particular, increasing a range of ballast frequencies for which a lighting arrangement may be compatible and improving a uniformity of providing power to the lighting arrangement for different ballast frequencies. Further, this interface circuit may allow the lighting arrangement to be connected to the same electronic ballast operating in different modes, as discussed above.

An embodiment thereby provides an interface circuit that may control a duty cycle of a signal provided at an output terminal (to a lighting arrangement), based on a frequency of an alternating power supply received at an input terminal (from an electronic ballast). This enables a same duty cycle for any power supply provided to the lighting arrangement, irrespective of a frequency of the electronic ballast. This would improve the uniformity of a dimming procedure for interface circuits connected to different electronic ballasts, such that a lighting arrangement outputs a same amount of light for a particular desired dimming level for different ballast frequencies.

In particular, a combined shunting period, being the total length of time that a shunting arrangement shunts the alternating power supply, within a predetermined time period (e.g. one second) may be controlled. Preferably, the combined shunting period within the predetermined time period may be controlled to be substantially the same (for a desired output of the lighting arrangement, such as a dimming level) for different potential frequencies of the alternating power supply provided by an electronic ballast.

Thus, for a given desired output, a proportion of the period of the alternating power supply in which the shunting arrangement shunts the alternating power supply is substantially the same across different potential frequencies of the alternating power supply provided by the electronic ballast. Continuing from the previous example, for a first ballast with a frequency of 500 KHz, the period of half cycle of the AC output is 10 µs. In providing a 50% dimming, the duration of the shunt switch is for example 5 µs. If this first ballast is replaced by a second ballast with 400 KHz output frequency, the period of half cycle is 12.5 µs, and the embodiment of the application tunes the shunt of 5 µs into for example 6.25 µs which is still 50% of the new ballast output period, thus the output of the LED is maintained.

Thus, a certain duration in each ballast output half cycle may be bypassed/shunted by the shunting arrangement. This duration may be controlled based on the frequency of the alternating current supply provided by the electronic ballast, so as to maintain a desired ratio of the shunt duration to the half cycle period.

This may provide improved functionality of the interface circuit and may, for example, provide a more consistent dimming operation of the lighting arrangement across different frequencies.

Preferably, the electronic ballast is a ballast for fluorescent lamps, and the interface circuit further comprising a dimming circuit adapted to obtain a desired lighting level of the lighting arrangement from a dimmer, the control arrangement is further adapted to, during each cycle of the alternating power supply, control the coupling configuration of the shunt arrangement based on the desired lighting level. This implementation is suitable for a scenario of dimming by duty cycle wherein the alternating power supply is provided to/bypassed from the lighting arrangement at a certain duty cycle.

Optionally, the desired lighting level comprises a dimming level of the lighting arrangement, and the control arrangement is adapted to, for a particular desired lighting level, maintain a substantially constant duty cycle of the alternating power supply provided to the output terminal, for different frequencies of the alternating power supply received at the input terminal.

The interface circuit may thereby shunt an alternating power supply provided at an input terminal based on a dimming level, indicative of a desired light output intensity of a lighting arrangement connected to an output terminal of the interface circuit. A demand for a high dimming level (i.e. low light demand) may result in the interface circuit shunting a greater proportion of the alternating power supply than a low dimming level (i.e. high light demand).

Further, the control arrangement further comprises a current control loop, different from controlling the duration based on the control signal, adapted to increase the shunt duration so as to reduce a current flowing through the lighting arrangement (CS) if the current flowing through the lighting arrangement (CS) is too large with respect to the dimming level (DIM). This provides another close loop control path that controls the duration according to dimming level, thus the duration is controlled according to the frequency of the ballast output as well as the dimming level.

More specifically, said control arrangement has a response time, for controlling the duration based on the control signal, comparable with respect to a speed of a variance in the different frequencies of the alternating power supply, and said current control loop has a response time substantially slower with respect to the speed of the variance in the different frequencies of the alternating power supply. This embodiment defines that a slow response in the close loop current control and a fast response in controlling the duration based on the control signal. By those two controls, the output lumen can be maintained in both short term and long term.

In embodiments, the detection arrangement comprises a control capacitor adapted to output a signal corresponding to the frequency of the alternating power supply.

An impedance of a control capacitor may depend upon the frequency of a signal applied thereto. Hence, a value of a current through the control capacitor is dependent upon a frequency of a signal received by the control capacitor. Thus, for different alternating power supplies provided to the control capacitor, having a same power but differing frequencies, a signal (e.g. current signal) output by the control capacitor may vary based on the frequency of the alternating power supply.

Preferably, the detection arrangement further comprises a square wave generator adapted to generate a square wave based on the alternating power supply and having the same frequency as the alternating power supply, wherein the square wave is provided to the control capacitor.

Use of such a square wave generator may help ensure that the power (e.g. voltage) of a signal provided to the control capacitor is kept substantially constant across a range of potential frequencies of the power supply provided by the electronic ballast. This may improve the reliability of the detection arrangement, as it can be more confidently assumed that the signal output by the control capacitor is primarily dependent upon a frequency of the signal received by the control capacitor and not, for example, a power or voltage.

In an alternative embodiment, a direct detection of the frequency of the electronic ballast is replaced by an indirection detection. More specifically, the detection arrangement comprises: a detection circuit, adapted to detect the duty cycle of the alternating power supply provided to the output terminal or the duty cycle of not short circuiting the electronic ballast; a comparing circuit, adapted to compare a present duty cycle and a previous duty cycle, and output the control signal if the present duty cycle deviates from the previous duty cycle by a certain ratio meanwhile the lighting level has not been changed at the dimming circuit.

This embodiment detects the duty cycle directly. Given the duration maintained, if the duty cycle changes but the lighting level has not been changed, it means the period/frequency of the ballast has changed. Thus the interface circuit can control the duration accordingly.

Therefore, the control signal in the present application includes a value directly obtained from analyzing the ballast output, and a value that is retrieved from analyzing other parameter as long as that parameter is influenced by the frequency of the ballast.

The control arrangement may comprise a timing capacitor, wherein a voltage across the timing capacitor determines a coupling of the shunt arrangement; a fixed current source connected to the timing capacitor to provide a fixed charge current to the timing capacitor; and a variable current source connected to the timing capacitor, wherein the variable current source is adapted to provide an additional charge current to the timing capacitor based on the control signal corresponding to the frequency of the alternating power supply provided at the input terminal, so as to vary a rate of charging the timing capacitor.

The voltage across the timing capacitor may define a period for which the shunt arrangement shunts the alternating power supply provided at the input terminal. In particular embodiments, when the voltage across the timing capacitor reaches a predetermined voltage level or a threshold voltage, the shunt arrangement is configured to switch from a shunting configuration to a conducting configuration. Thus, a charging time of the timing capacitor may define for how long the shunt arrangement shunts an alternating power supply provided at the input interface.

The variable current source changes the charge slope of the timing capacitor. In particular, the variable current source is adapted to alter the charge slope of the timing capacitor based on the frequency of the power supply received at the input terminals (i.e. the ballast frequency). The magnitude of the additional charge current may be proportional to the frequency of the alternating power supply. Thus the time for the timing capacitor to determine the shunt duration can be tuned to match the output frequency of the ballast.

In an embodiment, the control arrangement further comprises: a voltage threshold element, adapted to set a voltage threshold according to said desired lighting level; and said control arrangement is adapted to trigger a decoupling configuration of the shunt arrangement when the voltage on the timing capacitor reaching the voltage threshold. This embodiment defines how the voltage of timing capacitor controls the dimming level.

The control arrangement may comprise a variable input impedance connected to the input terminal; and an input control arrangement adapted to control the variable input impedance based on an ON/OFF command, wherein the detection arrangement is adapted to generate the control signal based on the ON/OFF command, and the control arrangement is adapted to control the shunt arrangement to operate in synchronization with half cycles of the alternating power supply.

An interface circuit may be provided with a variable input interface, which may be controllably switched so as to reduce the noise of the electrical ballast in different modes. This variable input interface inherently changes the output frequency of the ballast. Thus this embodiment can match the shunt arrangement with the different modes of the ballast.

Preferably, the variable input impedance is adapted to be switched between: a first impedance state having a first impedance; and a second impedance state having a second, greater impedance than the first impedance, and wherein the input control arrangement is adapted to switch the variable input impedance between the first impedance state and the second impedance state based on an ON/OFF command, and the detection arrangement is adapted to generate the control signal based on a switching of the variable input impedance.

This embodiment specifies how the variable input interface is switched. For example, in case of the lighting arrangement is to be OFF, a greater impedance is attached to the output of the ballast so as to limit its output current. The shunt arrangement is also synchronized with the ON/OFF of the lighting arrangement.

In embodiments, the variable input impedance comprises at least one variable capacitance. This embodiment provides a reactive impedance that tunes the ballast output with less power loss.

In an embodiment, the control arrangement is adapted to control the coupling of the shunt arrangement based on a difference between a first reference voltage and a second reference voltage, and the interface circuit further comprises a compensation circuit adapted to tune at least one of the first reference voltage and the second reference voltage based on the control signal.

This embodiment gives an alternative implementation in controlling the shunt arrangement, and how to realize the above tuning in this specific implementation.

A control capacitor may be adapted to output the control signal corresponding to the frequency of the alternating power supply, wherein the compensation circuit is adapted to tune the first reference voltage dependent upon the control signal. This embodiment gives a further specific implementation that changes the first reference voltage to tune the shunt arrangement.

The interface circuit may further comprise: a capacitor connected so as to be alternatively charged and discharged by the alternating power supply; wherein the control arrangement is adapted to control the coupling configuration of the shunt arrangement based on a voltage across the capacitor, wherein during a charging phase of the capacitor: if a voltage across the capacitor is below the first reference voltage, configure the coupling configuration such that current is unable to flow from the input terminal to the output terminal if the shunt arrangement; and if the voltage across the capacitor is at or above the first reference voltage, configure the decoupling configuration such that current is able to flow from the input terminal to the output; wherein during a discharging phase of the capacitor: if the voltage across the capacitor is above the second reference voltage, configure the coupling configuration such that current is unable to flow from the input terminal to the output terminal if the shunt arrangement; and if the voltage across the capacitor is at or below the second reference voltage, configure the decoupling configuration such that current is able to flow from the input terminal to the output; wherein said compensation circuit adapted to perform at least one of the following: decrease the first reference voltage in response to an increase in the frequency of the alternating power supply; and/or increase the second reference voltage in response to an increase in the frequency of the alternating power supply.

In this embodiment, how the shunt arrangement is controlled is specified: by the voltage of the capacitor transitioning between the two reference voltages. This capacitor is charged and discharged by the alternating power supply and its voltage varies. By setting two reference voltages, the capacitor's voltage changes how the shunt arrangement operates. This makes the control of the shunt arrangement more simple. And by changing at least one of the two reference voltages, the shunt arrangement can be tuned.

The interface circuit may further comprise a second reference voltage generator adapted to output the second reference voltage based on a comparison between: a signal indicative of the desired lighting level of the light arrangement; and one or more of the following: a first feedback signal indicative of a current passing through the light arrangement; and a second feedback signal indicative of the voltage across the light arrangement; wherein the comparator is adapted to switch between the first feedback signal and the second feedback signal in response to an ON/OFF command; and wherein the compensation circuit is adapted to decrease the first reference voltage according to the ON/OFF command.

In this embodiment, there are two alternative control loops: a current control loop for the normal operation wherein the current through the lighting arrangement is regulated and a voltage control loop for standby or OFF mode wherein the voltage across the lighting arrangement is regulated, preferably a voltage lower than the forward voltage of the lighting arrangement such that the lighting arrangement does not emit light in this standby/OFF mode but there are still voltage/power for the standby/OFF circuit. The interface circuit needs to switch between the two control loops. The inventors find that during the switching, there may be overshoot/undershoot in the signal of the control loops. Since this signal controls the second reference voltage to decide the shunt duration, this overshoot/undershoot in the signal of the control loops may cause the shunt out of normal control. This embodiment also tunes the first reference voltage depending on the switching of the control loop, the tuned first reference voltage and the changed second reference voltage balance with each other such that the shunt still in normal control.

The interface circuit may comprise a rectifier coupled to the input terminal, the rectifier being adapted to rectify the alternating power supply received at the input terminal.

Thus, a rectifier may be used to convert the generally alternating power supply into a current flowing in a single direction. The rectifier may form part of an AC-DC converter, converting the alternating power supply provided at the input terminal to a direct current power supply for provision at the output terminal. The lighting arrangement may, for example, only be operable with a DC power supply (such as an LED arrangement).

There is also proposed an LED lamp, comprising the interface circuit in the above aspects and LEDs as the lighting arrangement.

There is also proposed a method of operating a lighting arrangement with an electronic ballast, adapted to output an alternating power supply, the method comprising: coupling to the electronic ballast; coupling to the lighting arrangement; generating a control signal corresponding to a frequency of the alternating power supply received at the input terminal; obtaining a desired lighting level of the lighting arrangement; adjusting, using a shunt arrangement, a coupling configuration of the electronic ballast and the lighting arrangement; and controlling, during each cycle of the alternating power supply, the shunt arrangement based on at least the control signal and the desired lighting level.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

Figure 1:
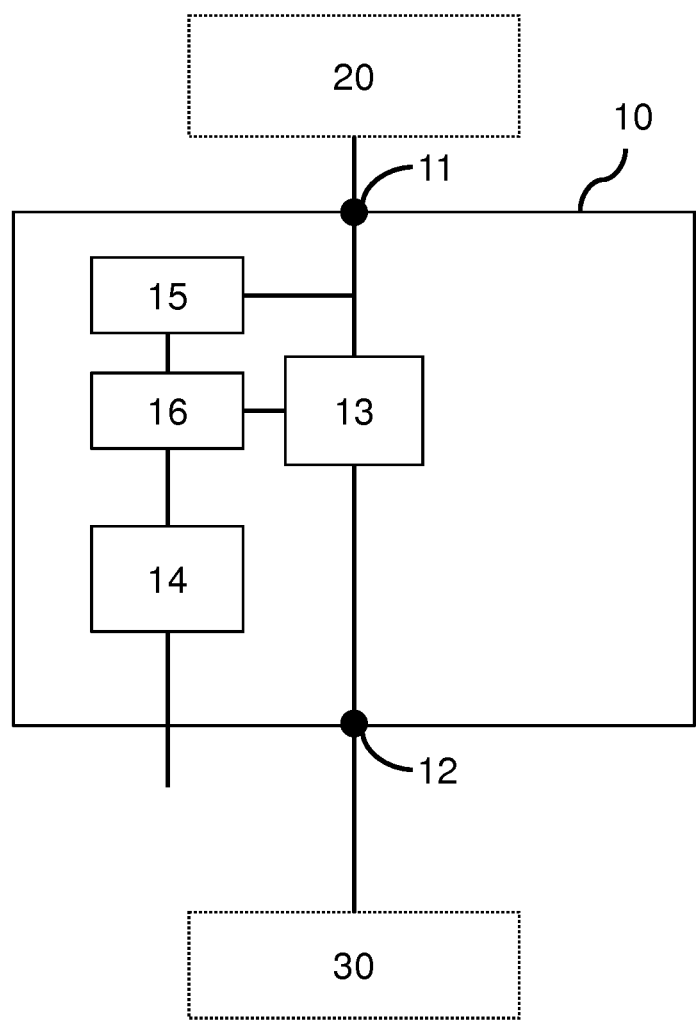
FIG. 1 is a block diagram of an interface circuit according to a general embodiment.

The invention provides an interface circuit for connecting a traditional electronic ballast of a tube lighting arrangement, such as a tube fluorescent lamp, to a lighting arrangement, such as a tube LED lamp. For the sake of clarity, the same reference numerals shall be used throughout this description to refer to same or similar elements of the various embodiments.

According to a concept of the invention, there is proposed an interface circuit for connecting an electronic ballast to a lighting arrangement, in which control of a coupling configuration of the interface circuit is dependent upon a frequency of the electronic ballast. In particular, a coupling configuration of the interface circuit is controlled based on the ballast frequency.

Embodiments are at least partly based on the realization that different frequencies of an electronic ballast may advantageously be taken into account so as to improve compatibility or uniformity of the interface circuit.

FIG. 1 illustrates a block diagram of an interface circuit 10 according to a general embodiment.

The interface circuit 10 comprises an input terminal 11 connectable to an electronic ballast 20, and an output terminal 12 connectable to a lighting arrangement 30. The input terminal 11 and the output terminal 12 are connectable together via a shunt arrangement 13. The electronic ballast 20 provides an alternating power supply operating at a particular frequency. This frequency may be referred to as the 'ballast frequency'.

The shunt arrangement 13 is adapted to control a coupling (and in turn a decoupling) configuration between the input terminal 11 and the output terminal 12, so as to control a current flow from the input terminal to the output terminal. In particular, the shunt arrangement is adapted to controllably couple and decouple the input terminal or the output terminal together, thereby 'not shunting' and 'shunting' the input terminal respectively (so that 'shunting' means bypassing or disconnecting). Thus, the shunt arrangement may control a current flow between the input terminal 11 and the output terminal 12, and may thereby control a coupling configuration between the terminals.

For example, the shunt arrangement may couple at least one of the input terminal and the output terminal to a reference voltage so as to shunt the input terminal. In other embodiments, the shunt arrangement may couple nodes of the input terminal together (i.e. short circuit the input terminal). This process may be alternatively described as 'not shunting' (where the current flow between the input terminal and the output terminal is configured such that the lighting arrangement is powered) or 'shunting' (where the current flow between the input terminal and the output terminal is configured such that such that the lighting arrangement is not powered).

A duration for which the coupling configuration is such that current is not able to flow from the input terminal 11 to the output terminal 12 (and through the lighting arrangement 30) may be referred to as a shunt duration.

Preferably, the interface circuit 10 comprises a dimming circuit 14, which is adapted to determine or obtain a desired lighting level of the lighting arrangement 30. The dimming circuit 14 may, for example, directly receive a user input corresponding to a desired lighting level via a dimmable switch either wired or wirelessly, or receive a desired lighting level from a central controller or hub (such as a smart home hub).

The interface circuit 10 further comprises a detection arrangement 15 adapted to generate a control signal corresponding to a frequency of the alternating power supply provided by the electronic ballast 10. Thus, the detection arrangement 15 may be connected to the input terminal 11 to receive or monitor the alternating power supply.

The interface circuit 10 further comprises a control arrangement 16 adapted to control the coupling of the shunt arrangement 13. That is, the control arrangement 16 determines the coupling configuration of the interface circuit 11. The control arrangement 16 controls the coupling of the shunt arrangement 13 based on at least the determined frequency of the alternating power supply at the input terminal 11 and the desired lighting level. In the traditional product, the shunt arrangement is normally controlled only according to the dimming level to enable a dimming of the lighting arrangement. Such a scenario can be seen in US20090303720A1.

By way of example, if the dimming circuit 14 indicates that a desired lighting level of the lighting arrangement is OFF (i.e. no light output), the control arrangement 16 may continually couple the input terminal and/or the output terminal to a reference voltage.

For a differential input terminal 11, such as an input terminal comprising two nodes, the coupling of the input terminal 11 to a reference voltage may consist of or comprise shorting the nodes of the input terminal. Thus, coupling the input terminal to a reference voltage may comprise coupling a first node of the input terminal to a second node of the input terminal. A similar step may be taken for a differential output terminal, mutatis mutandis. Shorting the nodes of the input terminal may also be suitable for the electronic ballast since the electronic ballast, which is often self-oscillated, prefers a continuation of its output current so as to maintain its oscillation and operation.

Figure 2:
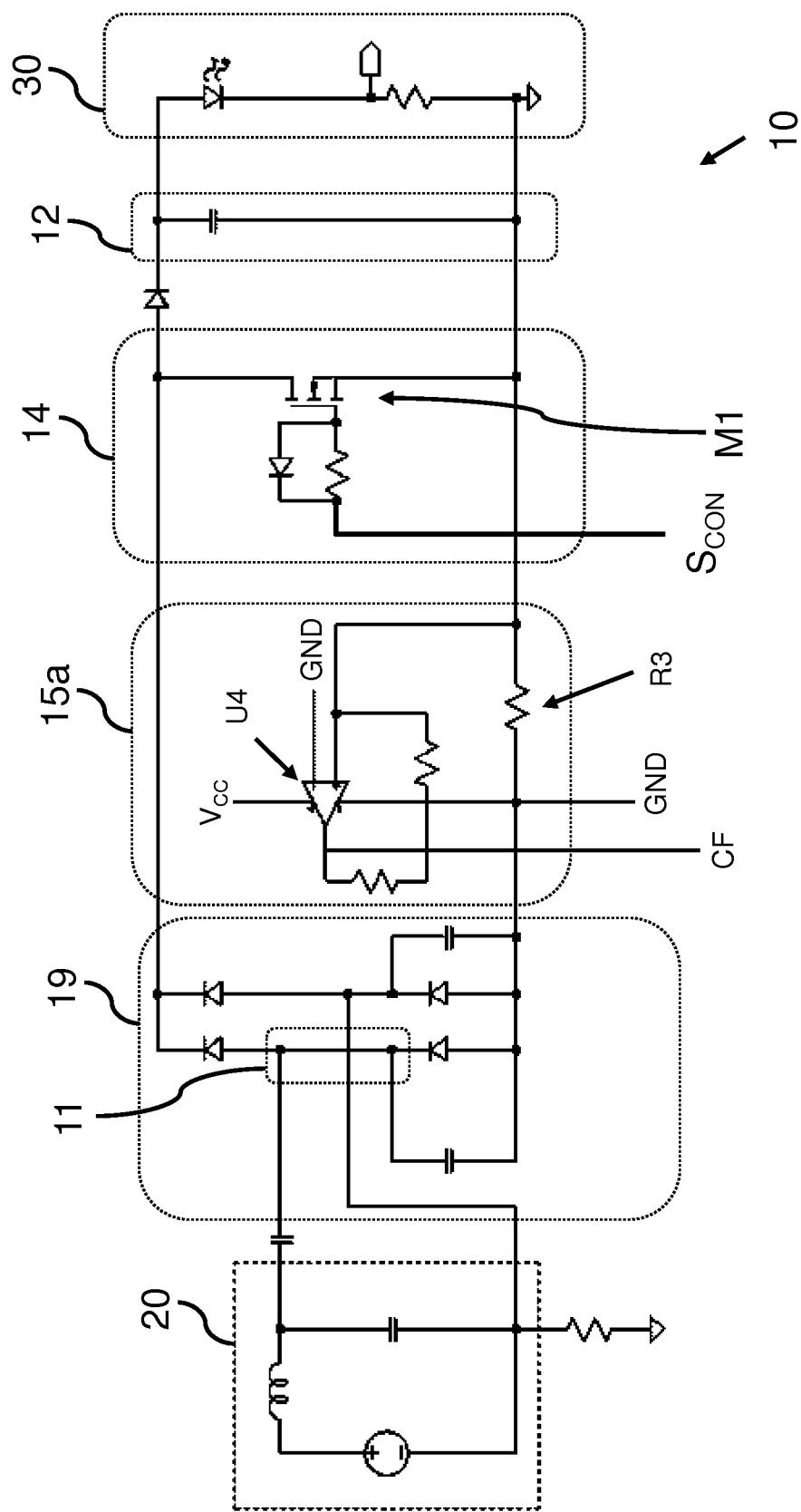
FIG. 2 is a circuit diagram of an interface circuit according to a first embodiment.

FIG. 2 is a circuit diagram of the interface circuit 10 according to a first embodiment. Illustrations of the control arrangement and the dimming circuit have been omitted. As previously described, the interface circuit controls a coupling configuration between an input terminal 11, connectable to an electronic ballast 20, to an output terminal 12, connectable to a lighting arrangement 30.

The shunt arrangement 14 adjusts the coupling configuration of the input terminal 11 and the output terminal 12. In particular, the shunt arrangement 14 is adapted to controllably couple both the input terminal 11 and the output terminal 12 to a reference voltage GND, here ground or earth, in response to a shunt control signal $S_{CON}$. The shunt arrangement comprises a shunt MOSFET M1, which receives the shunt control signal $S_{CON}$ to determine whether to shunt the input terminal and the output terminal to the reference voltage GND.

When the shunt control signal $S_{CON}$ is high, the shunt arrangement couples the input terminal and the output terminal to the reference voltage, forming a shunting coupling configuration, thus there is no current flow from the input terminal 11 through the lighting arrangement 30 via the output terminal 12. When the shunt control signal $S_{CON}$ is low, the shunt arrangement decouples the input terminal and the output terminal from the reference voltage, forming a non-shunting coupling configuration. Thus, when the shunt control signal $S_{CON}$ is low, current may flow from the input terminal 11 and through the lighting arrangement 30 coupled to the output terminal 12.

In this way, a shunt control signal $S_{CON}$ adjusts a coupling configuration of the interface circuit 10 so as to selectively enable current to flow from the input terminal to the output terminal, or to selectively bypass the output terminal (by selectively grounding the input terminal) such that current is unable to flow from the input terminal through the lighting arrangement connected to the output terminal.

The interface circuit 10 further comprises a rectifier 19 coupled to the input terminal 11, the rectifier being adapted to rectify the alternating power supply received at the input terminal. Such a rectifier may be required if, for example, the lighting arrangement 20 is only operable with a DC voltage.

FIG. 2 also illustrates a first portion 15a of the detection arrangement. The first portion 15a comprises a comparator U4, which is used in detecting the current of the alternating power supply of the ballast. In particular, a sensing resistor R3 detects the current waveform provided at the input terminal 11, being representative of the alternating power supply. The comparator U4, transforms the sine current signal detected by the sensing resistor R3 to a rectangular voltage signal CF (i.e. a square wave). The rectangular voltage signal operates at the (rectified) ballast frequency, being the frequency of the (rectified) alternating power supply provided by the electronic ballast at the input terminal.

Figure 3A:
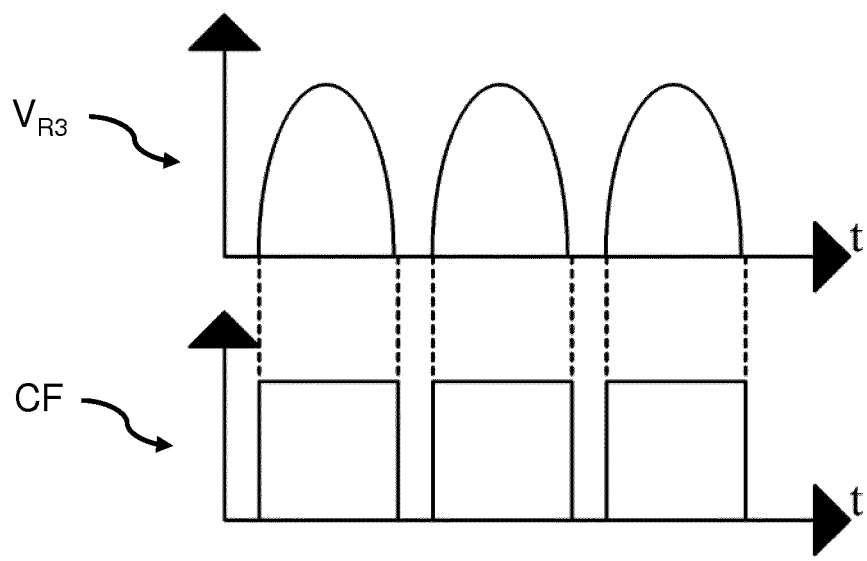
FIG. 3A illustrates representative charts of an operation of a square wave generator for the interface circuit according to the first embodiment.

FIG. 3A is a graph illustrating a voltage $V_{R3}$ across the sensing resistor R3 and the rectangular voltage signal CF output by the comparator U4 in a particular scenario. It will be apparent that different ballast frequencies are associated with different periods of time for which the rectangular voltage signal CF is at a maximum (i.e. different high times).

Figure 3B:
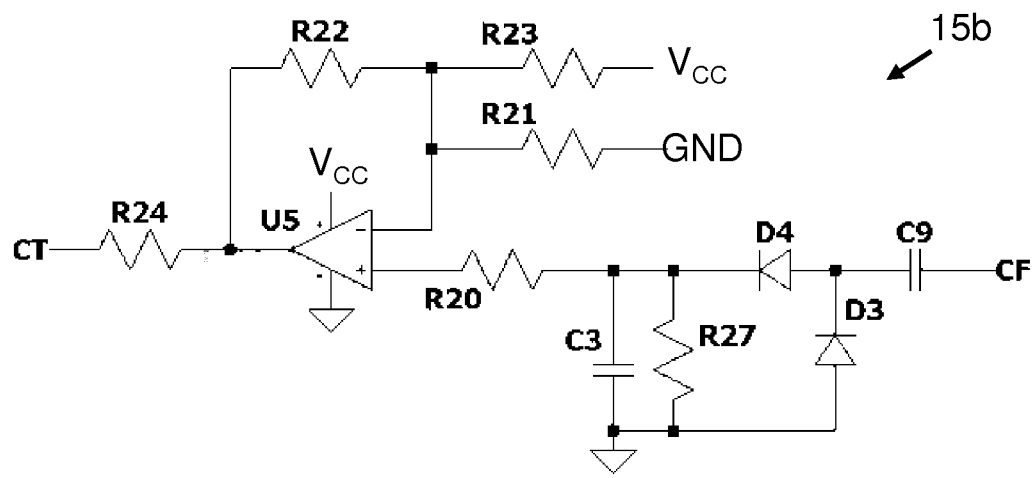
FIG. 3B illustrates a portion of a detection arrangement for the interface circuit according to the first embodiment.

FIG. 3B illustrates a second portion 15b of the detection arrangement. In particular, the second portion 15b may be used to generate a control signal CT corresponding to the frequency of the alternating power supply received at the input terminal (i.e. the ballast frequency).

The second portion 15b receives the rectangular voltage signal CF generated by the comparator U4. An impedance ($Z_{C9}$) of a control capacitor C9, having a capacitance $C_{C9}$, depends upon the frequency ($f_{CF}$) of the rectangular voltage signal CF, in accordance with the following equation:

$$Z_{C9} = \frac{1}{j2\pi \cdot f_{CF} \cdot C_{C9}} \quad (1)$$

Thus, different ballast frequencies, which result in different frequencies of the rectangular voltage signal CF, result in a different impedance of the control capacitor C9. Thus, the current through control capacitor C9 is dependent upon and linear with the ballast frequency. This current may be used as the control signal corresponding to the frequency of the alternating power supply. However, preferably, the current through the control capacitor is amplified as hereafter described.

A first converting resistor R27 is used to convert the different current through control capacitor C9 to a voltage signal, which is smoothed by smoothing capacitor C3. The smoothed voltage signal is amplified by an amplifier U5 to result in an amplified voltage signal. The gain of the amplifier U5 may be in the region of 14.5 dB, and may be defined by appropriately selected gain resistors R22, R23, R21. A rectifier arrangement, comprising diodes D3, D4, may ensure that only a positive side of the rectangular voltage signal CF is provided to the amplifier U5, and may reduce noise.

The amplified voltage signal is provided to a conversion resistor R24, which outputs a proportional current signal CT. The proportional current signal CT is a control signal corresponding to the ballast frequency (i.e. the frequency of the alternating power supply provided to the input terminal of the interface circuit).

It should be noted that any other kind of frequency detection, either integrated or discrete, can be used instead.

For example, the detection arrangement comprises a detection circuit, adapted to detect the duty cycle of the alternating power supply provided to the output terminal or the duty cycle of not short circuiting the electronic ballast, and a comparing circuit, adapted to compare a present duty cycle and a previous duty cycle, and output the control signal if the present duty cycle deviates from the previous duty cycle by a certain ratio meanwhile the lighting level has not been changed at the dimming circuit. In an example, the frequency of ballast in normal burning is 50 KHz, the frequency in ignition is 60 KHz. Assume Ton is 8us and the duty cycle is 8/20=40% for 50 KHz. When ballast working frequency become higher and jitter to 60 kHz for same Ton (8 us), the duty cycle become higher 8/16.67=48%, less power goes to the LED and the lamp will become darker. The change in the duty cycle is around 20%. Actually, the frequency jitter between normal burning and ignition can cause a change in the duty cycle as small as 1%.

In the embodiment, if the detection arrangement detects that a later duty cycle has changed from a previous duty cycle by more than 1%, it means a large variance in the frequency of the ballast output, and the duration should be controlled as mentioned above. The detection should happens in the same or similar frequency of the ballast's output frequency. Note that the later duty cycle and the previous duty cycle do not necessary be neighbor.

Figure 4A:
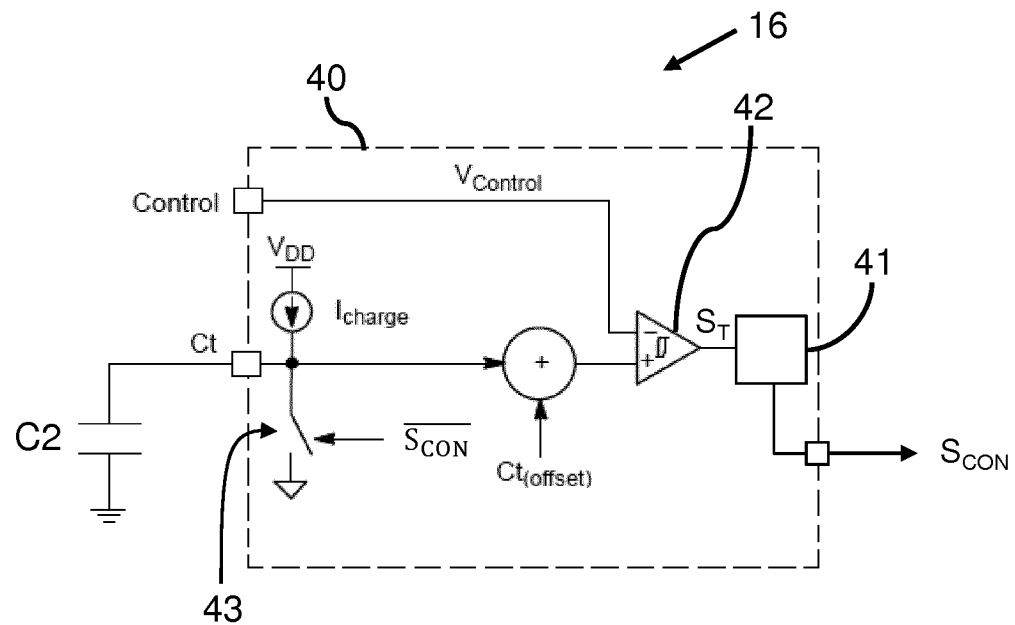
FIG. 4A is a circuit diagram of a control arrangement according to the first embodiment.

FIG. 4A illustrates a control arrangement 16 for controlling an operation of the shunt arrangement 13 according to an embodiment.

The control arrangement 16 comprises a timing capacitor C2 and a shunt control unit 40. The shunt control unit 40 is adapted to output the shunt control signal $S_{CON}$ for controlling the shunt arrangement. In particular, the shunt control signal $S_{CON}$ is dependent upon a voltage Ct across the timing capacitor C2.

The shunt control unit 40 may comprise a shunt control signal processor 41 adapted to generate the shunt control signal that drives the MOSFET M1 based on at least a trigger signal $S_T$.

At the start of each cycle or half-cycle of the alternating power supply, the zero crossing is detected, and the shunt control signal processor pulls the shunt control signal $S_{CON}$ high. An inverted signal of the shunt control signal $S_{CON}$ starts a charging of the capacitor C2. When a trigger signal $S_T$ is received, the shunt control signal processor 42 pulls the shunt control signal $S_{CON}$ low. The components of the control arrangement 16 adapted to generate the trigger signal $S_T$ will be hereafter described.

A constant or fixed current source $I_{charge}$ is connected to a timing capacitor C2, and a reference voltage (e.g. ground) via a controllable switch 43. The controllable switch is controlled by an inverse of the shunt control signal $S_{CON}$, such that when the shunt control signal is low, the controllable switch is closed to discharge the capacitor C2 and vice versa.

Figure 4B:
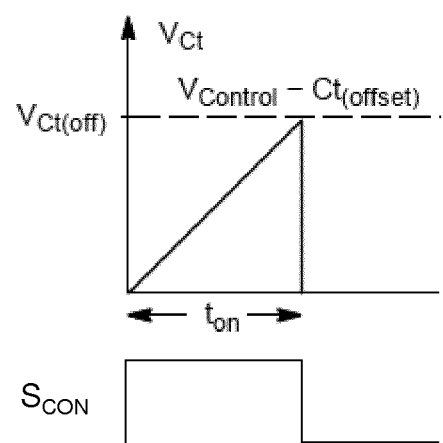
FIG. 4B illustrates representative charts of an operation of the control arrangement according to the first embodiment.

At the start of a cycle of the alternating power supply, the controllable switch C2 is opened (as $S_{CON}$ is high) and the fixed current source $I_{charge}$ begins charging the timing capacitor C2 with a constant current. In this way, a voltage Ct across the timing capacitor linearly increases as the timing capacitor charges, as illustrated in FIG. 4B.

A comparator 42, such as a Schmitt trigger, compares the voltage Ct across the timing capacitor C2 to a predetermined voltage level $V_{CONTROL}$. When the voltage across the timing capacitor is at or above a predetermined voltage level $V_{CONTROL}$ (at a time $t_{on}$), the trigger signal $S_T$ is generated.

By way of example, a signal output by the comparator 42 may be low when the voltage Ct is less than the predetermined voltage level $V_{CONTROL}$, but high when the voltage Ct is greater than or at the predetermined voltage level $V_{CONTROL}$.

The shunt control signal processor receives the trigger signal $S_T$ and pulls the shunt control signal $S_{CON}$ low, controlling the shunt arrangement to adjust the coupling configuration such that current may flow from the input terminal to the output terminal.

Thus, a length of time ($t_{on}$) over which the timing capacitor is charging to reach the voltage level $V_{CONTROL}$ defines the length of time for which no current flows from the input terminal and through the lighting arrangement coupled at the output terminal (i.e. the input terminal is shunted). The longer the timing capacitor is charging, the longer the input terminal is shunted.

The predetermined voltage level $V_{CONTROL}$ may be defined by a dimming circuit, such that the predetermined voltage level $V_{CONTROL}$ corresponds to a desired lighting level of the lighting arrangement. By way of example, the greater the value of the predetermined voltage level $V_{CONTROL}$, the greater a desired dimming level, and the longer a period of time for which the shunt control signal $S_{CON}$ is output (to thereby shunt the power supply provided at the input terminal).

The predetermined voltage level $V_{CONTROL}$ and/or the voltage Ct across the timing capacitor may be offset by an offset voltage $Ct_{(offset)}$. Thus, the offset voltage $Ct_{(offset)}$ may adjust the length of time for which the timing capacitor is charging (and thereby the length of time for which the input terminal is shunted). That is, the offset voltage is used to tune the Ct voltage/shunt duration.

It will be apparent from the foregoing that the alternating power supply is shunted for a period of time during each cycle of the alternating power supply. In particular, the shunt control signal $S_{CON}$ has a same frequency as that of the alternating power supply. The length of time for which the timing capacitor C2 charges thereby defines the duty cycle of the alternating power supply provided to the output terminal.

Figure 4C:
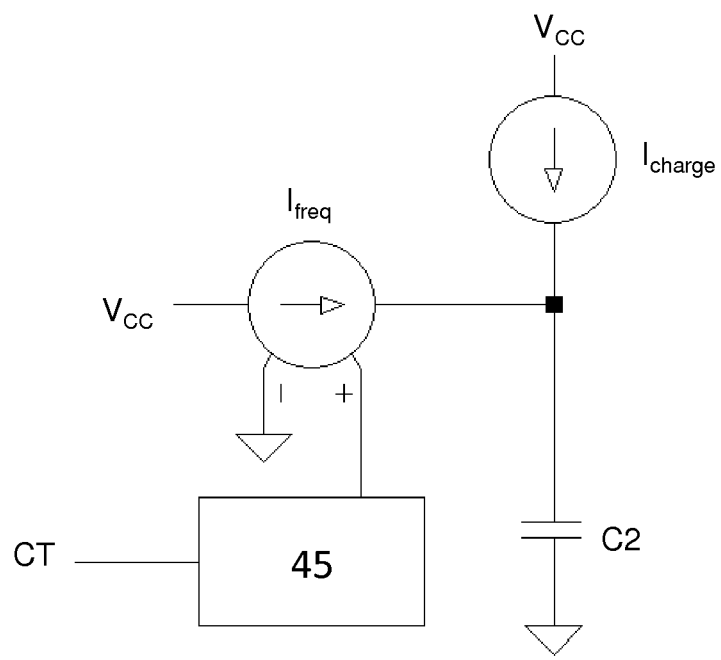
FIG. 4C illustrates a modification to the control arrangement according to the first embodiment.

According to an embodiment, and as illustrated in FIG. 4C, the control arrangement 16 may be modified by provision of a variable current source $I_{freq}$, which supplements the fixed current source $I_{charge}$ in charging the timing capacitor C2. Other components of the control arrangement 16 have been omitted from FIG. 4C for the sake of clarity.

The variable current source $I_{freq}$ is adapted to be dependent upon a frequency of the alternating power supply as detected by the detection arrangement. In particular, a current controller 45 is adapted to receive the proportional current signal CT, being the control signal, and control a current output by the variable current source based on the proportional current signal or control signal. In this way, a charge slope, being the rate at which the timing capacitor charges, and thereby total charging time $t_{on}$ to reach $V_{CONTROL}$, the timing capacitor C2 may be adjusted. The shunt control signal $S_{CON}$ thereby depends upon and corresponds to the frequency of the alternating power supply provided by the electronic ballast.

Provision of the variable current source $I_{freq}$ in this manner enables the control arrangement 16 to maintain a same ratio between shunt duration and total period for different ballast frequencies. In particular, by controlling the charge slope of the timing capacitor based on a frequency of the alternating power supply, a same duty cycle of an alternating power supply may be maintained for different ballast frequencies.

For example, by increasing the charge slope proportionally with the ballast frequency, a relative period of time for which the input terminal is shunted may be maintained. That is, a proportion of a shunt duration to a period of the alternating power supply may be maintained for different frequencies. Preferably, the current output by the variable current source is proportional to the ballast frequency.

Thus, a total period of time for which the lighting arrangement receives power (within a predetermined period of time, e.g. one second) may remain substantially constant for differing frequencies of the electronic ballast.

Thus, an interface circuit and accompanying lighting arrangement may be compatible with a greater number of electronic ballasts present in the market. In particular, a dimming level may be unified across different electronic ballasts (i.e. each electronic ballast dims at a same rate).

Through detecting the frequency of the electronic ballast via rectangular voltage signal CF, embodiments provide a frequency dependent current output connected to a timing capacitor so as to adjust a charge ratio of the timing capacitor. Conventionally, the charge current may otherwise be constant (i.e. provided by only the fixed current source $I_{charge}$) so the charge slope is fixed. Provision of the frequency dependent current source $I_{freq}$ enables the charge slope to be altered based on the ballast frequency.

Figure 4D:
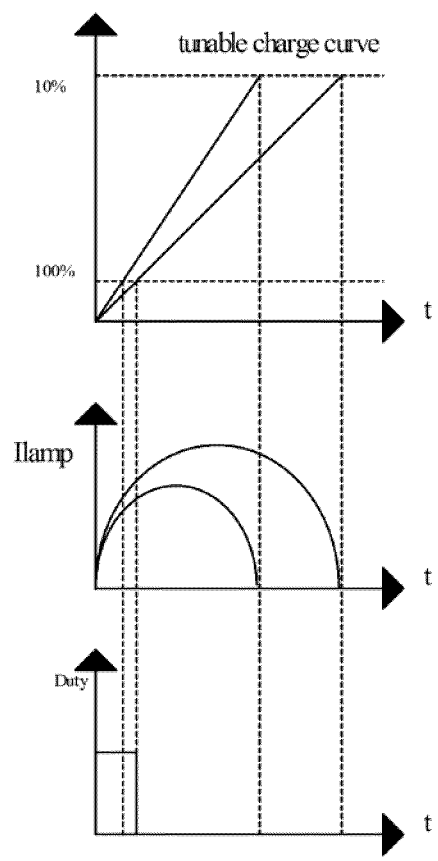
FIG. 4D is schematic illustrations of signals corresponding to the interface circuit according to the first embodiment.

FIG. 4D gives a schematic illustration. The Ilamp curves shows two output current of electronic ballast with different frequency. The tuneable charge curves show the voltage on the timing capacitor for different output frequency of the ballast, and also shows the $V_{CONTROL}$ for 100% lighting level down (near fully ON) and 10% lighting level (nearly OFF). Taking 100% for example, the different charge curves on the timing capacitor reach the $V_{CONTROL}$ by a different duration as shown in the upper drawing, and this different duration result the same ratio to its own output period of the ballast. Thus the duty cycle of shunt and the output of the lamp is still the same. For a lighting level between 100% and 10%, the principle is the same.

The above embodiment describes a first implementation in dimming. The following example will give another implementation.

Figure 5:
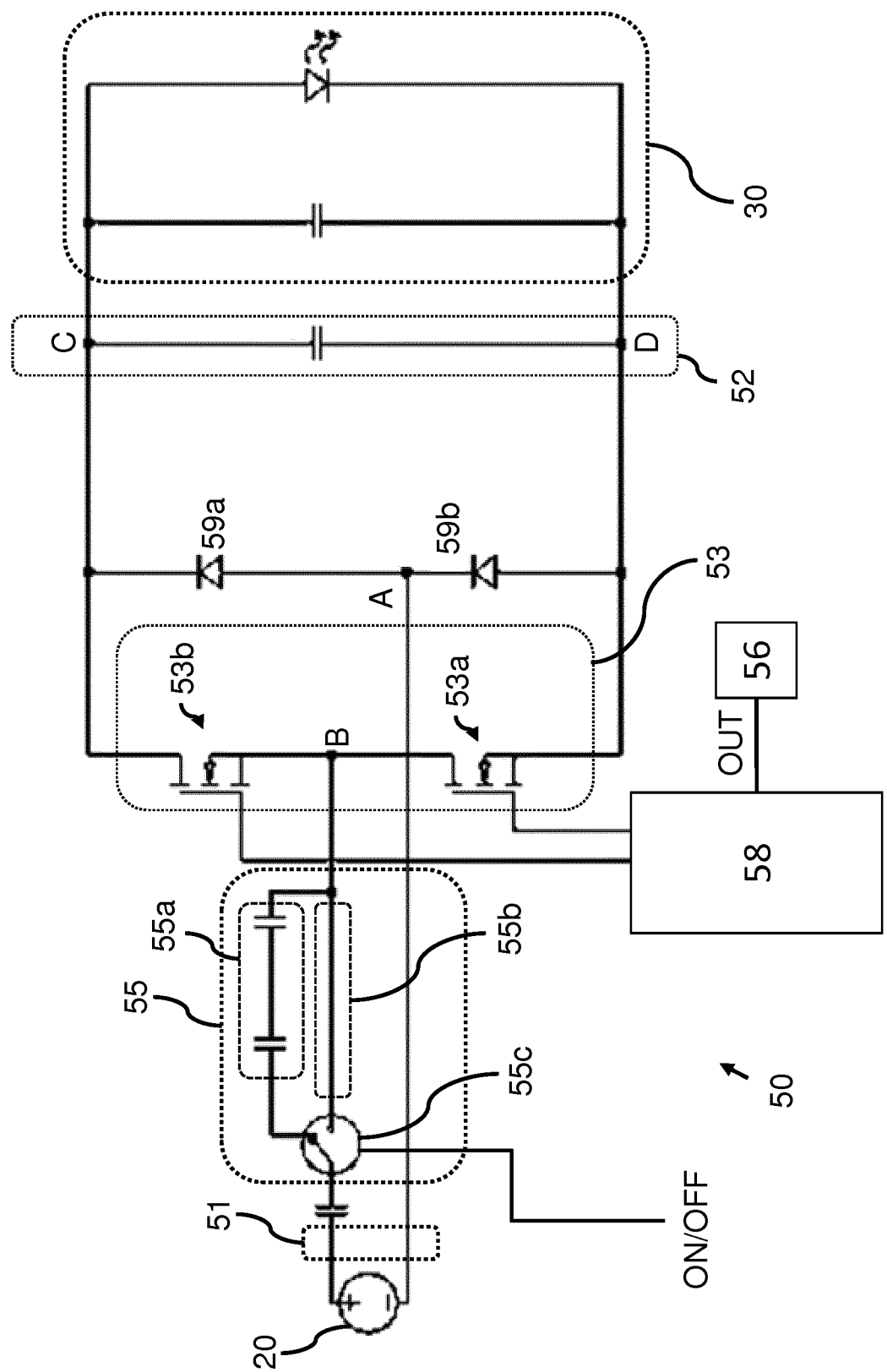
FIG. 5 is a circuit diagram of an interface circuit according to a second embodiment.

FIG. 5 schematically depicts an interface circuit 50 according to a second embodiment of the invention. The interface circuit comprises an input terminal 51, for connecting to an electronic ballast 20 and an output terminal 52 for connecting to a lighting arrangement 30. Here both the input and output terminals are formed from two nodes (e.g. a differential input or output).

The interface circuit 50 comprises a first node A and a second node B. The first node A is connected to a lower terminal of the electronic ballast, and the second node B is connected, via the variable input impedance, to a higher terminal of the electronic ballast. As such, the alternating power supply provided by the electronic ballast in the present embodiment is a differential power supply. In particular, it may be understood that a voltage signal at the first node A is typically the inverse of the voltage signal at the second node B since the electronic ballast 20 outputs an alternating current (AC) supply. Thus, the voltage at the second node B is representative of the alternating power supply, and the voltage at the first node A is representative of an inverse of the alternating power supply.

The output terminal 52 comprises a positive node C and a negative node D. The lighting arrangement 30 may be connected between the positive node C and the negative node D. The lighting arrangement 30 is powered when a voltage provided to the positive node C is greater than a voltage provided to the negative node D. The lighting arrangement 30 preferably comprises a light emitting diode (LED).

The interface circuit 50 comprises a variable input impedance 55. The variable input impedance comprises a first impedance arrangement 55a, having a first impedance, and a second impedance arrangement 55b having a second, lower impedance.

An input control arrangement 55c is adapted to switch the variable input impedance 55 between a first impedance state and a second impedance state with a higher impedance based on an ON/OFF command. The ON/OFF command represents an instruction to turn the lighting arrangement on or off, and may, for example, be received from a user input (such as a toggle switch) or a central controller or hub (such as a smart home hub). Thus, an input impedance of the interface circuit may be controlled by the input control arrangement based on an ON/OFF command. Preferably, the switch 55c is closed in the first impedance state such that the impedance arrangement 55a is bypassed by the impedance arrangement 55b, and the switch 55c is open in the first impedance state such that the impedance arrangement 55a is in the power loop.

Controlling an input impedance based on an ON/OFF command is performed in order to control a current from the electronic ballast 20. In particular, by increasing the input impedance of the interface circuit when the LED arrangement is to be turned OFF, by switching from the second impedance arrangement to the first impedance arrangement, the output current from the ballast is reduced and a noise from the electronic ballast may be decreased. A prior application describing this technology can be found in PCT/CN2016/097661 and its descendant applications.

It is recognized that altering an input impedance of the interface circuit 50 may alter an effective frequency or period of an alternating power supply provided to the interface circuit 50 at the first node A. For example, if the capacitance of the first input impedance arrangement 55a is switched into the circuit, the output frequency of the electronic ballast increases.

The skilled person will recognize that a ballast output frequency is related to the inductance and capacitance of inductors and capacitors operating the oscillation circuit. The inductor is typically formed as part of the ballast and is thereby not changed. Capacitors include those both inside and outside of ballast. Thus, when the outside capacitor is changed, the frequency will change.

Embodiments proposed and hereafter described enable this change in the effective frequency to be taken into account.

The interface circuit 42 comprises a shunt arrangement, formed of a first 59a and second 59b diode and shunt switches 53. The first diode 59a is positioned between the first node A and a positive node C of the output terminal. The second diode 59b is positioned between the negative D of the output terminal and the first node A.

The shunt switches 53 are adapted to control a coupling configuration of the input terminal 51 and the output terminal 52. In particular, the shunt switches 53 are adapted to control a coupling between the nodes A, B of the input terminal and the nodes C, D of the output terminal, so as to control current flow from the electronic ballast 20 and through the lighting arrangement 30. The first diode 59a, the second diode 59b and the shunt switches 53 may thereby together be considered to be a rectifier as well as the shunt arrangement, which will be discussed below. It should be noted that this switch-integrated bridge is only an example, and other implementations such as separated diode bridge and shunt switch in parallel with output of the diode bridge, like the first embodiment, can also be used.

The shunt switches 53 comprises a first MOSFET 53a adapted to controllably couple the second node B to the negative node D of the output terminal 52. The shunt switches 53 further comprises a second MOSFET 53b adapted to controllably couple the second node B the positive node C of the output terminal, thereby providing a controllable coupling between the second node B and the nodes C, D of the output terminal.

As the positive C and negative D nodes of the output terminal are coupled to the first node via the first 59a and second 59b diodes, the shunt arrangement may thereby also control a current flow between the first node A and the second node B of the input terminal. Similarly, the shunt arrangement controls a current flow between the first node A and the nodes of the output terminal. In this way the shunt arrangement may control a current flow between nodes of the input terminals 51 and nodes of the output terminal 52.

A shunt controller 58 controls the operation of the shunt arrangement, so as to control whether the second node B of the input terminal is coupled to the positive node C of the output terminal or a negative node D of the output terminal. In this way, the shunt controller 58 may control whether the input terminal is 'shunted' or 'not shunted'.

When the coupling configuration of the nodes A, B of the input terminal and the nodes C, D of the output terminal is such that current flows from a node A, B of the input terminal to a positive node C of the output terminal and through the lighting arrangement to a negative node D of the output terminal, the input terminal is considered 'not shunted'. When the coupling configuration of the nodes A, B of the input terminal and the nodes C, D of the output terminal is such that current does not flow from a node A, B of the input terminal to the positive node C of the output terminal and through the lighting arrangement to the negative node D of the output terminal, the input terminal is considered 'shunted'.

The shunt controller 58 control the operation of the shunt arrangement based on a single shunt control signal OUT received from a control arrangement 56. In a proposed embodiment, if the single shunt control signal OUT is high, the shunt controller causes the first MOSFET 53a to not conduct a current, whereas the shunt controller causes the second MOSFET 53b to conduct a current. If the single shunt control signal OUT is low, the shunt controller causes the first MOSFET 53a to conduct a current, whereas the shunt controller causes the second MOSFET 53b to not conduct a current.

Thus, the shunt control signal OUT controls whether the second node B is coupled to the positive node C of the output terminal 12, or a negative node D of the output terminal. This controlling, together with the polarity of the output the electronic ballast at the node B and the node A, determines whether shunt or not-shunt happens. Thus, the shunt control signal OUT may control a coupling configuration of the interface circuit 50. This will be discussed in more detail later.

Figure 6:
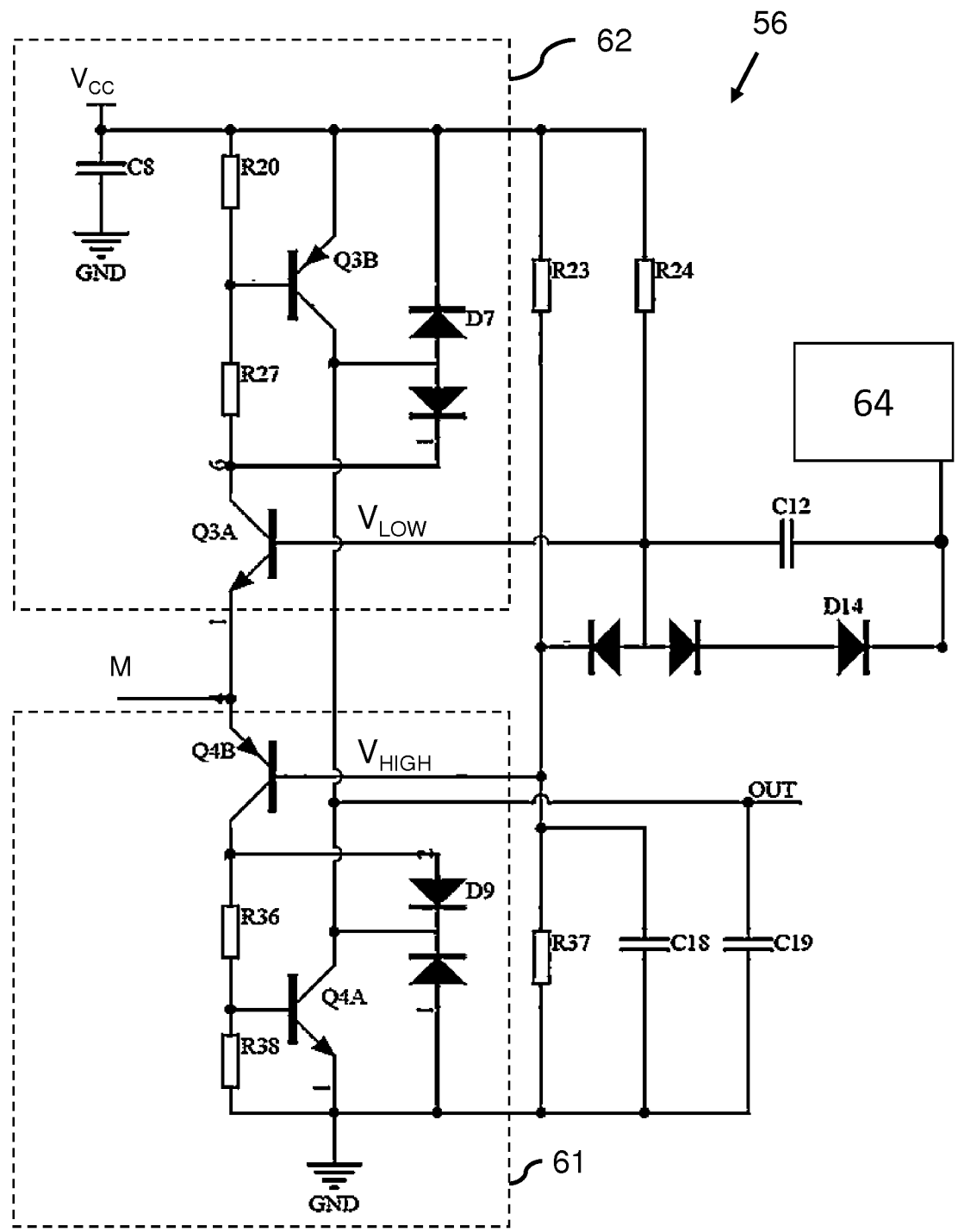
FIG. 6 is a circuit diagram of a control arrangement according to the second embodiment.
Figure 7:
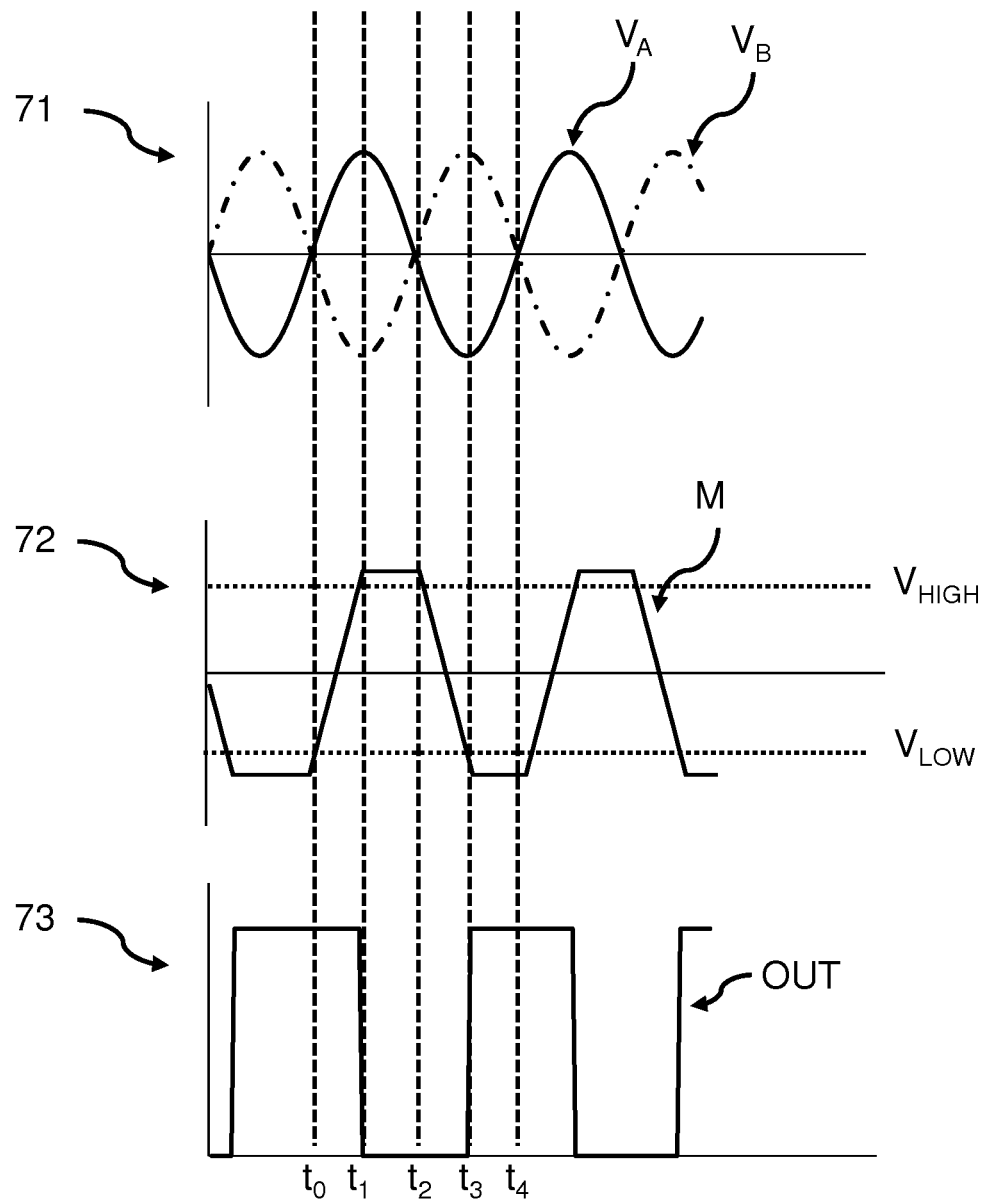
FIG. 7 illustrates representative charts of an operation of the control arrangement according to the second embodiment.

Further reference is now made to FIG. 6, which illustrates a control arrangement 56 for generating the shunt control signal OUT according to an embodiment, and FIG. 7, which illustrates an operation of the interface circuit 50 and the control arrangement 56.

The control arrangement 56 generates the shunt control signal OUT for controlling the first 53a and second 53b MOSFETs. Of course, the skilled person will appreciate that other apparatus for controlling the first and second MOSFETs may also be realized.

The shunt control signal OUT is generated on the basis of a first reference voltage $V_{HIGH}$ and a second reference voltage $V_{LOW}$, together with a power indicative signal M, which is corresponding to a voltage of the (inverse) alternating power supply provided at first node A of the interface circuit 50. As described earlier, first node A may be considered to be the inverse of the alternating power supply provided by the electronic ballast 20.

The power indicative signal M may linearly track a mathematical sign (i.e. positive or negative) of the alternating power supply at first node A. Generally, the power indicative signal M is adapted to rise/increase (preferably linearly) or 'charge' when first node A is positive and fall/decrease or 'discharge' when first node A is negative. A timing circuit capable of generating the power indicative signal M in this manner will be described later with reference to FIG. 8.

A pull-down arrangement 61 pulls the shunt control signal OUT to a reference voltage GND when the power indicative signal M reaches the first reference voltage $V_{HIGH}$ (plus the junction voltage $V_{BE}$ of the transistor Q4B). In particular, when the power indicative signal M raises to or above the first reference voltage $V_{HIGH}$ a first transistor Q4B is switched on, resulting in a second transistor Q4A being turned on via the resistor R36. The resistor R38 ensures a suitable biasing voltage is provided to the second transistor Q4A, by acting with the resistor R36 as a voltage divider. The switched-on second transistor Q4a pulls the shunt control signal OUT to the reference voltage GND (e.g. ground or earth).

A pull-up arrangement 62 pulls the shunt control signal OUT to a power supply voltage $V_{CC}$ when the power indicative signal M reaches the second reference voltage $V_{LOW}$ (minus the junction voltage $V_{BE}$ of the transistor Q3A). In particular, when power indicative signal M drops to or below the second reference voltage $V_{LOW}$, a third transistor Q3A turns on, resulting in fourth transistor Q3B being turned on via the resistor R27. The resistor R20 ensures a suitable biasing voltage is provided to the fourth transistor Q3B, by acting with the resistor R36 as a voltage divider. The switched-on fourth transistor pulls the shunt control signal OUT to the power supply voltage $V_{CC}$ (i.e. pulls the shunt control signal OUT high).

Thus, when the shunt control signal OUT is initially at a power supply voltage $V_{CC}$, the shunt control signal will remain at the power supply voltage until the power indicative signal M has risen to a value of the first reference voltage $V_{HIGH}$, when it will switch to a value of the reference voltage GND. Similarly, when the shunt control signal OUT is initially at a reference voltage GND, the shunt control signal will remain at the reference voltage until the power indicative signal M has reduced to a value of the second reference voltage $V_{LOW}$.

The first reference voltage $V_{HIGH}$ is defined by a voltage divider comprising a pair of resistors R23, R37. A capacitor C18 filters high frequency noise from the first reference voltage, such as mains hum. The second reference voltage $V_{LOW}$ is generated by a second reference voltage generator 64.

An output capacitor C19 filters high frequency noise or AC components from the shunt control signal OUT. The control arrangement 56 further comprises diode arrangement D7, D9 and D14. With particular reference now to FIG. 7, an operation of the control arrangement 56 and the interface circuit 50 will be described. FIG. 7 illustrates a first illustrative waveform 71 of the voltage VA at first node A and a voltage VB at second node B, a second illustrative waveform 72 of the power indicative signal M and a third illustrative waveform 73 of the shunt control signal OUT.

For the present explanation, the base-emitter and base-collector voltages for the various transistors are shown second illustrative waveform 72 (e.g. the highest value of M is higher than the $V_{HIGH}$ by a base-emitter voltage and the lowest value of M is lower than the $V_{LOW}$ by a base-emitter voltage) but may be not considered in detail in text description, although the skilled person will readily understand the causal relationship and the relevant differences, which are illustrated in the Figures.

The operation of the control arrangement 56 during a particular cycle of the voltage at first node A may be divided into four distinct phases, each phase being associated with a particular value for shunt control signal OUT. Furthermore, each phase is associated with a different current flow between the positive node C and the negative node D of the output terminal (i.e. through the lighting arrangement 30).

At a beginning ($t_0$) of a first phase ($t_0$-$t_1$), the power indicative signal M is at a minimum (as the voltage at first node A has previously been negative), but the shunt control signal OUT is high. This results in the second MOSFET 53b being controlled so as to conduct a current, and the first MOSFET 53a being controlled so as to not conduct a current. As the second MOSFET 53b conducts a current, the first node A is coupled to the second node B via the first diode and the second MOSFET 53b. Thus, the input nodes are coupled together (i.e. short-circuited), and current provided by the electronic ballast 20 bypasses a load 30 provided across nodes of the output terminal 52. When the input nodes are coupled together, no current may flow through the load at the output terminal. In other words, the input terminal is 'shunted'.

During the first phase, as the voltage at first node A is positive, the power indicative signal M increases. A duration of the first phase may be labelled a 'first shunt duration'.

A second phase ($t_1$-$t_2$) begins when power indicative signal M rises to or above the first reference voltage $V_{HIGH}$, taking the base-emitter voltage into account where appropriate. In response to the power indicative signal reaching the level of the first reference voltage $V_{HIGH}$ the pull-down arrangement 61 pulls the shunt control signal OUT to the reference voltage GND. Furthermore, the power indicative signal is pulled to the value of the first reference voltage $V_{HIGH}$. Thus, at a beginning ($t_1$) of a second phase ($t_1$-$t_2$), a control signal is pulled low, and a power indicative signal M is at the first reference voltage $V_{HIGH}$.

During the second phase ($t_1$-$t_2$), although first node A continues to be positive, the power indicative signal M is maintained at the value of the first reference voltage $V_{HIGH}$ due to the switched-on first transistor Q4b pulling the power indicative signal to the first reference voltage $V_{HIGH}$.

During the second phase ($t_1$-$t_2$) the shunt control signal OUT is pulled to a reference voltage (i.e. is low). As such, the second MOSFET 53b is controlled so as to not conduct a current, and the first MOSFET 53a is controlled so as to conduct a current. This results in the first node A being coupled to the positive node C of the output terminal via the first diode, and the second node B being coupled to the negative node D of the output terminal. Thus, current may flow from the first node A (having a positive voltage) to the second node B (having a negative voltage) via a load across the nodes of the output terminal.

That is, during the second phase $t_1$-$t_2$ the voltage at the first node A and the positive terminal C is positive, and the voltage at the second node B and negative terminal D is negative, power may be thereby provided by the electronic ballast to a lighting arrangement connected to the output terminal. In other words, the input terminal is 'not shunted'.

A third phase ($t_2$-$t_3$) begins when the voltage at first node A becomes negative. During the third phase ($t_2$-$t_3$) the shunt control signal OUT is maintained at the reference voltage (i.e. is low). As such, the second MOSFET 53b is controlled so as to not conduct a current, and the first MOSFET 53a is controlled so as to conduct a current.

However, as the voltage at first node A is negative, and the voltage at second node B is now positive, current flows from second node B to first node A via the second diode 53b. As such, the input nodes are coupled together (i.e. short-circuited), and current provided by the electronic ballast bypasses a load provided across nodes of the output terminal 52. When the input nodes are coupled together, no power is directly provided by the electronic ballast at the input terminal to the output terminal. In other words, the input terminal is 'shunted'.

During the third phase, as the voltage at first node A is negative, the power indicative signal M decreases.

A duration of the third phase may be labelled a 'second shunt duration', and the first shunt duration and the second shunt duration may together be considered the 'shunt durations', and combined as the combined or total shunt duration.

A fourth phase ($t_3$-$t_4$) begins when the power indicative signal M falls to a second reference voltage $V_{LOW}$. When power indicative signal M drops to or below the second reference voltage $V_{LOW}$, the pull-up arrangement 61 pulls the shunt control signal OUT to the power supply voltage $V_{CC}$ (i.e. pulls the shunt control signal OUT high).

As the shunt control signal OUT is high, the second MOSFET is controlled so as to conduct a current, and the first MOSFET is controlled so as to not conduct a current. This results in the second node B being coupled to the positive node C of the output terminal via the second MOSFET, and the negative node D of the output terminal being coupled to first node A via the second diode.

Thus, current may flow from the second node B (having a positive voltage) to the first node A (having a negative voltage) via a load across the nodes of the output terminal. In particular, as during the fourth phase $t_3$-$t_4$, the voltage at the second node B and the positive node C is positive, and the voltage at the first node A and the negative node D is negative, power may be provided by the electronic ballast to a lighting arrangement connected to the output terminal. In other words, the input terminal is 'not shunted'.

As will be apparent, the fourth phase ends (and the first phase begins anew) at a time $t_4$, when the voltage at the first node A becomes positive once more.

The first and second phase may together be considered to be a 'charging phase' of the power indicative signal M, and the third and fourth phase may together be considered to be a 'discharging phase' of the power indicative signal M.

In summary, when the voltage at the first node A changes between negative and positive, shunting occurs. So in one half cycle of the voltage at the first node A, shunting happens first (i.e. no power is provided to the output terminal) and then a 'non-shunt' (in which power is provided to the output terminal). This switch state in those non-shunts causes the next (inverse) half cycle to shunt at first.

The control arrangement 56 is therefore adapted to control a coupling configuration of the shunt arrangement during each cycle of the alternating power supply. By varying a value of the first reference voltage $V_{HIGH}$ and the second reference voltage $V_{LOW}$ a shunt duration during each half-cycle of the alternating power supply may be controlled, thereby enabling control over the duty cycle of power supplied to a lighting arrangement coupled to the output terminal. A duration of the first phase ($t_0$-$t_1$), first shunt duration, and the third phase ($t_2$-$t_3$), second shunt duration, represent the shunt durations of each half-cycle of the alternating power supply. Together, the duration of the first phase and the duration of the third phase may represent the total shunt duration of the interface circuit 50.

The first reference voltage $V_{HIGH}$ and the second reference voltage $V_{LOW}$ determine the phase shift range, namely the length of the shunt durations.

By way of example, lowering the second reference voltage $V_{LOW}$ would result in a greater period of time before the fourth phase begins (i.e. increased duration of the third phase), and the shunt control signal OUT is pulled high (i.e. the input terminal is no longer shunted). Similarly, lowering the second reference voltage $V_{LOW}$ would result in an increased duration of the first phase (as the value of the power indicative signal is initially lower at the start to of the first phase, and thereby takes longer to reach the first reference voltage $V_{HIGH}$). In short, lowering the second reference voltage $V_{LOW}$ would extend the shunt duration.

Similarly, raising the first reference voltage $V_{HIGH}$ would result in an increased duration of the first phase $t_0$-$t_1$, such that the shunt control signal OUT remains low, and the input terminal continues to be shunted for a greater period of time, as well as an increased duration of the third phase.

Generally speaking, a voltage at first node A starts the delay, via the power indicative signal M, and $V_{HIGH}$ and Wow define the shunt duration times. In a prior circuit, $V_{HIGH}$ is presently a fixed level (e.g. 4.4V) determined by R23 and R37. Wow is determined by a second reference voltage generator 64. The second reference voltage generator 64 is for providing current control loop in operation mode and voltage control loop in standby/OFF mode. The higher the Wow and the lower the $V_{HIGH}$, the shorter the shunt duration times (i.e. the shorter the period before power is provided to the output terminal).

Thus, the width of the band between $V_{HIGH}$ and $V_{LOW}$ determines the overall shunt delay time. As briefly indicated previously, this duration may be defined by these reference voltages, but also by the base-emitter voltage ($V_{BE}$) of the transistors Q3a and Q4b, which may be around 0.65V.

During a first half-cycle of the voltage at first node A (when the voltage is positive), when signal M rises above $V_{HIGH}$ Q4b turns on and as a result Q4a is turned on via R36, and signal Out is pull to ground via Q4a. During a second half-cycle, when M drops below $V_{LOW}$, Q3*a* turns on and as a result Q3*b* turns on via R27, and Out is pulled to 5V (i.e., the power supply $V_{CC}$) via Q3*b*.

Other components, such as resistors R30, R27, R36, R38 are for providing appropriate biasing levels. Capacitor C12, C18 and C19 are provided to filter noise.

Figure 8:
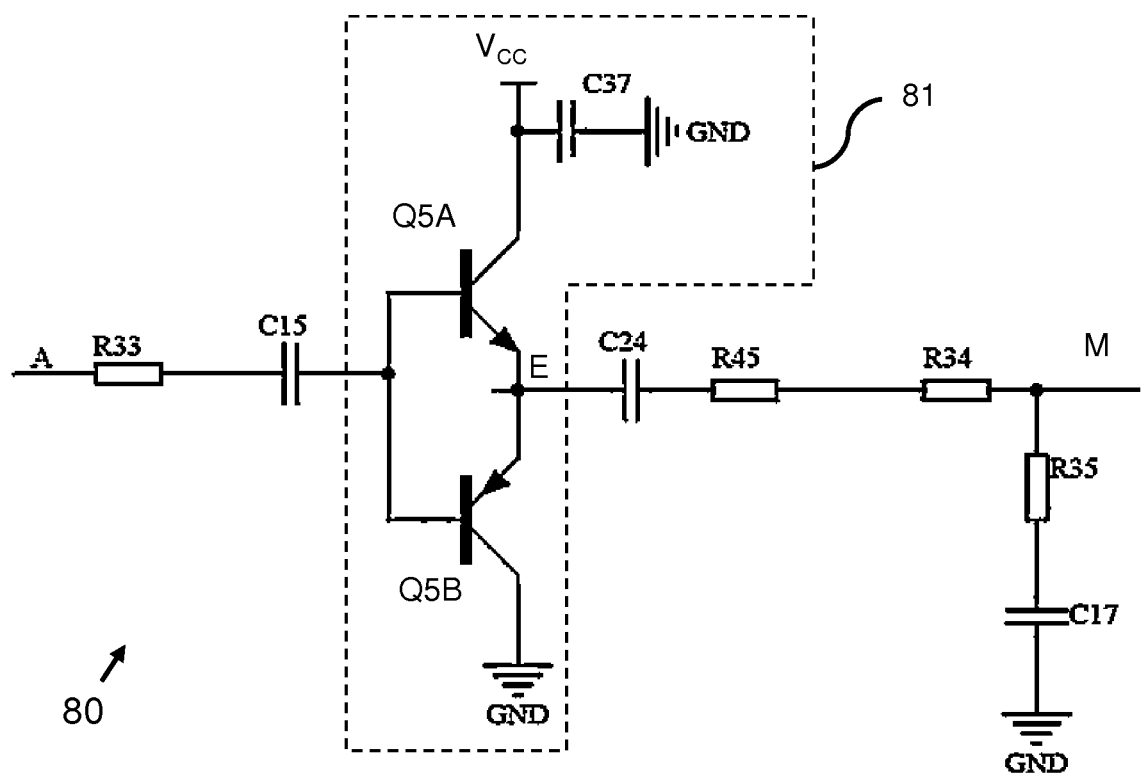
FIG. 8 illustrates a timing circuit for the interface circuit according to the second embodiment.

FIG. 8 illustrates a timing circuit 80 for generating the power indicative signal M.

The timing circuit 80 is connected to first node A of the interface circuit 50. A square wave generator 81, comprising a pair of transistors Q5A, Q5B, is adapted to generate a square wave based on the voltage at the first node A. In particular, when a voltage at first node A is positive, transistor Q5A is activated, and pulls an output E of the square wave generator to a power supply $V_{CC}$. When a voltage at second node B is negative, transistor Q5B is activated, and pulls an output E of the square wave generator 81 to a reference voltage GND.

Thus, the square wave generator 81 converts a generally sinusoidal alternating power supply into a square wave.

The output E of the square wave generator 81 is provided to a RC circuit comprising a resistor R35 and a charging capacitor C17. Thus, the square wave output may charge and discharge the RC circuit so as to control a value of the power indicative signal M. The power indicative signal M may represent the voltage between the RC circuit and a ground (reference) voltage. In this way, the voltage at first node A of the interface circuit controls the value of the power indicative signal M.

Other capacitors C15, C37, C24 and resistors R33, R45, R34 of the timing circuit are provided as an input/output impedance, to filter noise and to filter any DC biasing where appropriate.

Figure 9:
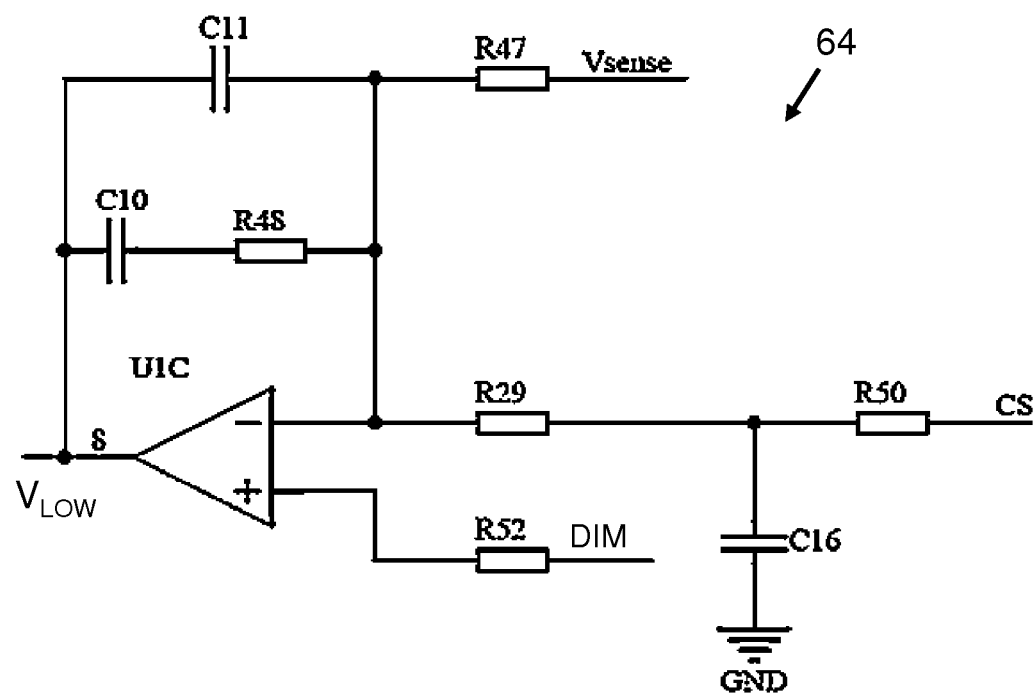
FIG. 9 illustrates a second reference voltage generator for the interface circuit according to the second embodiment.

FIG. 9 illustrates a second reference voltage generator 64 according to an embodiment.

The second reference voltage generator 64 is adapted to generate the second reference voltage $V_{LOW}$ on the basis of a lighting level signal DIM, indicative of a desired lighting level of the lighting arrangement, a first feedback signal CS, indicative of a current flowing through the lighting arrangement and a second feedback signal $V_{SENSE}$, indicative of a voltage across the lighting arrangement.

The skilled person would recognize that one of the feedback signals CS, $V_{SENSE}$ may be omitted, and the second reference voltage generator 64 may generate the second reference voltage $V_{LOW}$ based on the lighting level signal DIM and a sole feedback signal. More than two feedback signals may be used in the generation of the second reference voltage $V_{LOW}$.

The second reference voltage generator comprises a comparator, here an amplifier U1C, having a feedback system C11, C10, R48 coupling the output of the amplifier U1C to a negative input of the amplifier. The lighting level signal DIM is provided to a positive input of the amplifier U1C, via resistor R52. The first feedback signal CS is coupled to the second reference voltage generator via a low-pass filter R50, C16, and the filtered signal is provided to a negative input of the amplifier U1C via a resistor R29. The second feedback signal $V_{SENSE}$ is also provided to the negative input of the amplifier U1C via a resistor R47.

The second reference voltage generator 64 may thereby enable control of the second reference voltage $V_{LOW}$ in at least two modes. There may be a current loop mode, in which the current through the lighting arrangement, as indicated by the first feedback signal CS primarily influences the second reference voltage $V_{LOW}$. Similarly, there may be a voltage loop mode, in which the voltage across the lighting arrangement, as indicated by the second feedback signal $V_{SENSE}$ primarily influences the second reference voltage $V_{LOW}$.

In particular embodiments, the second reference voltage generator 64 may be adapted to switch between comparing based on the first feedback signal CS and the second feedback signal $V_{SENSE}$ based on an ON/OFF command. For example, a switch (not shown) may controllably provide one of the two signals to the negative input of the amplifier U1C based on the ON/OFF command.

The second reference voltage generator 64 may thereby act as a control loop. For example, if the lamp current CS is too large, the second reference voltage generator 64 would generate a lower output at the amplifier, this lowered output gives a lower $V_{LOW}$ thus the shunt duration will be longer so as to reduce the lamp current.

Typically, when a lighting arrangement is switched from on to off, the control loop (second reference voltage generator) 64 will switch from operating in a current loop mode to operating in a voltage loop mode. In doing so, the amplifier U1C in the control loop (second reference voltage generator) will produce an inrushing low voltage. This inrushing low voltage will influence the value of the second reference voltage $V_{LOW}$ (in particular, lowering the value of the second reference voltage) to drop and make the control arrangement unintentionally over-control and increase the shunt durations (i.e. the length of the first and third phases). This may lead to the control loop switching from a closed loop operation to an open loop operation. For example, the duration of discharging from the $V_{HIGH}$ to the lowered $V_{LOW}$ is longer, this duration corresponds to the shunt duration, and the shunt duration becomes so long that the shunt extends to another half cycle, which make the shunt out of control.

When the ON/OFF command indicates the lighting arrangement is to be switched off, the ON/OFF command signal will cause a change in the value of the lighting level signal DIM, the first feedback signal CS and the second feedback signal $V_{SENSE}$. This in turns leads to a change in the value of the second reference voltage $V_{LOW}$.

A range of the available voltage difference between the first reference voltage $V_{HIGH}$ and the second reference voltage $V_{LOW}$ limits the range of frequencies of the electronic ballast with which the interface circuit may operate effectively, and limits the range of electronic ballast frequencies which can be shut down effectively. In particular, it has been recognized that the range of possible voltage differences between the first reference voltage $V_{HIGH}$ and the second reference voltage $V_{LOW}$ restricts the maximum and/or minimum shunt duration time.

Consider a scenario is which it is desired to entirely shunt a low-frequency alternating power supply at the input terminal so as to switch a lighting arrangement off. The maximum shunt duration is defined by a maximum possible value of the first reference voltage $V_{HIGH}$, and the minimum possible value of the second reference voltage $V_{LOW}$. That is, the first $(t_0-t_1)$ and third $(t_2-t_3)$ phases, being the shunt durations, have a maximum length defined by the maximum controllable difference between the first and second reference voltages. The maximum length of the first and third phases may not be sufficient to wholly shunt the low-frequency alternating power supply, as a half-cycle of the alternating power supply may be greater than the maximum possible difference length of the shunt durations. In this way, the control arrangement may, unintentionally, enter the second and fourth phases respectively, and thereby not shunt the alternating power supply, when the ballast frequency is low.

Similarly, the minimum shunt duration time limits a maximum frequency for which the interface circuit is compatible, as the alternating power supply may move from a first (e.g. positive) half-cycle to a second (e.g. negative) half-cycle before the power indicative signal has reached the first reference voltage $V_{HIGH}$ and/or the second reference voltage $V_{LOW}$. Thus, the second and/or fourth phase may be unintentionally bypassed, resulting in an excessive duration of shunting when it is desired to switch a lighting arrangement on.

Thus, the electronic ballasts associated with frequencies which are out of the range will result in an abnormal operation of the interface circuit, in particular the shunting operation.

As discussed above, the frequency increase due to the additional capacitance of 55a reduce the period of half cycles of the ballast output, and the decrease in the $V_{LOW}$ extends the shunt duration, this would cause the duty cycle of shunt to be long and out of control. The present embodiment proposes to tune the first reference voltage $V_{HIGH}$ to compensate them. Since the discharging duration from $V_{HIGH}$ to $V_{LOW}$ and the charging from Wow to $V_{HIGH}$ determines the shunt duration, by tuning the $V_{HIGH}$ also down, the shunt duration can be tuned to be reduced and match the above changed frequency and Wow.

Figure 10:
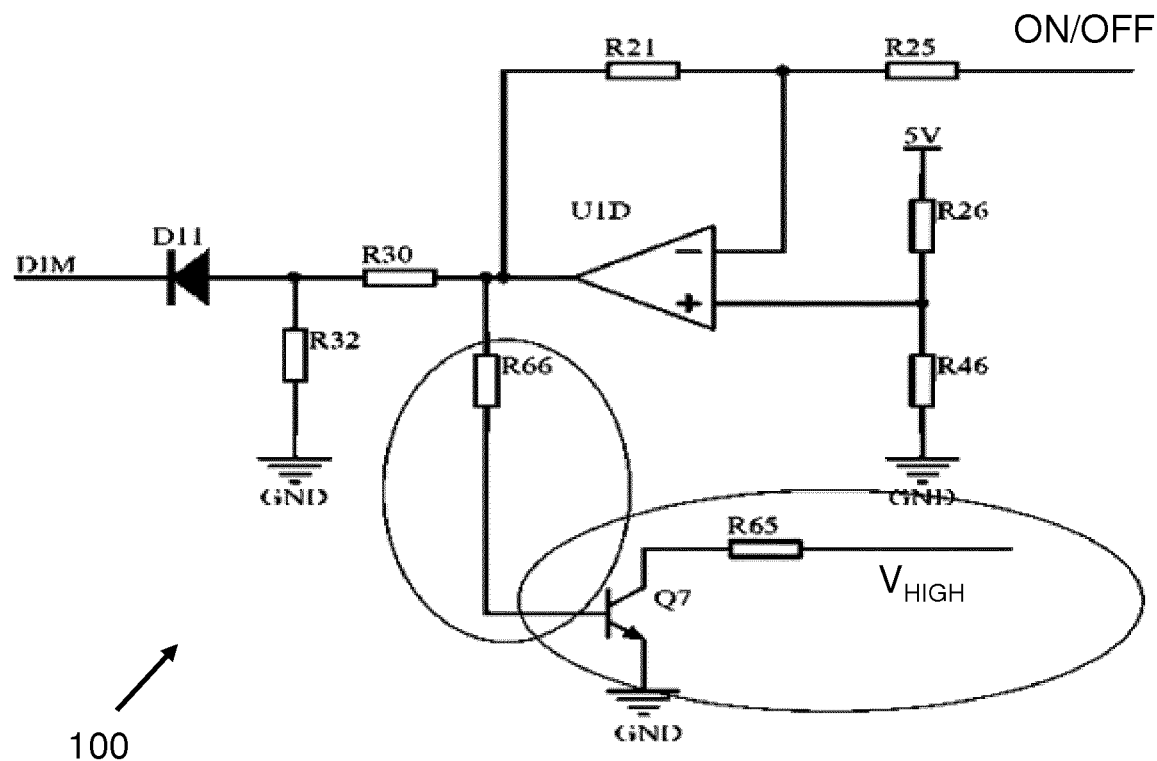
FIG. 10 illustrates a compensating circuit for the interface circuit according to the second embodiment.

FIG. 10 illustrates a compensating circuit 100 adapted to influence a value of the lighting level signal DIM and influence a value of the first reference voltage $V_{HIGH}$.

The compensating circuit is adapted to receive the ON/OFF command corresponding to an instruction to turn the lighting arrangement on or off. The lighting level signal DIM may be controlled by the dimming circuit, in particular, pulled high when an OFF command is sent.

Preferably, the lighting level signal DIM is a voltage threshold below the forward voltage of LEDs (which may be the value of $V_{SENSE}$). Thus the second reference voltage signal Wow, as generated by the second reference voltage generator 64, remains low.

The compensating circuit comprises an operational amplifier U1D. The compensating circuit also comprises a first reference voltage influencing arrangement, comprises a pair of resistors R65, R66 and a transistor Q7.

When the ON/OFF command is low, the output of the operational amplifier U1D is high, which pulls the lighting level signal to a high voltage (divided by the voltage divider R30, R32). Furthermore, the transistor Q7 turns on and the first reference voltage $V_{HIGH}$ is pulled to a reference voltage GND by resistor R65. Thus, a value of the first reference voltage $V_{HIGH}$ is reduced, the duration of discharging from a reduced $V_{HIGH}$ to the reduced is $V_{LOW}$ is also reduced, thereby reducing the shunt durations.

As described earlier, when a lighting arrangement is switched from on to off, an inrush voltage lowering the value of the second reference voltage $V_{LOW}$. By lowering the first reference voltage $V_{HIGH}$ in response to the ON/OFF command going low, an appropriate range of voltages between the first reference voltage $V_{HIGH}$ and the second reference voltage $V_{LOW}$ may be maintained, allowing the interface circuit to shunt the input terminal appropriately (when the lighting arrangement is switched off).

Thus, a range of ballast frequencies with which the interface circuit is compatible may be increased, as a maximum and minimum shunting time may be managed and maintained appropriately.

The above embodiment uses the ON/OFF signal to indicate a potential increase in the ballast's output frequency, without detecting the frequency change itself. In an alternative embodiment, the frequency of the ballast output can be detected.

Figure 11:
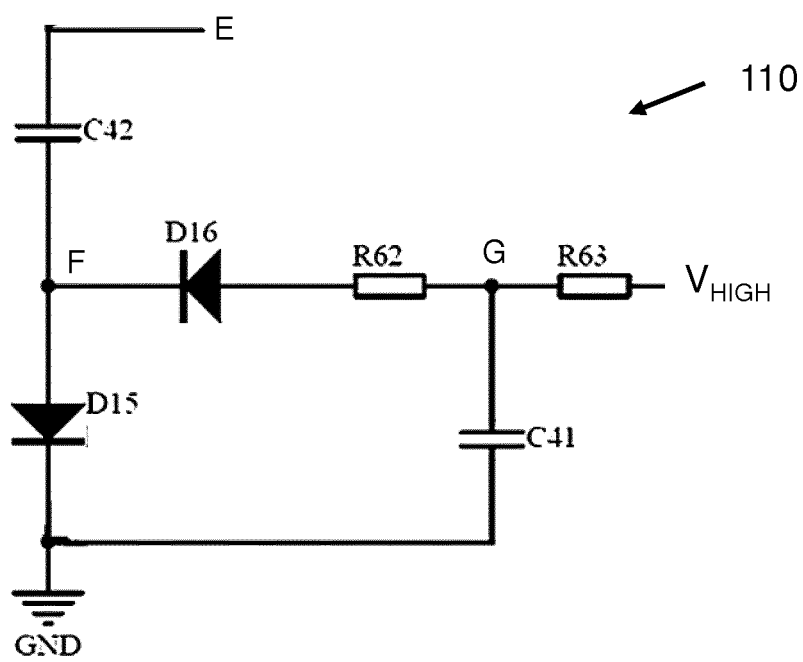
FIG. 11 illustrates a frequency compensating circuit for the interface circuit according to the second embodiment.

FIG. 11 illustrates a frequency detection circuit and compensating circuit for an interface circuit according to the second embodiment. The compensating circuit is adapted to influence a value of the first reference voltage $V_{HIGH}$. The frequency compensating circuit includes capacitors C41, C42, resistors R62, R63 and diodes D15 and D16.

The frequency compensating circuit receives the output E of the square wave generator of the timing circuit. A voltage at point F is dependent upon a frequency of the output E of the square wave generator, and may thereby be used as a frequency detector. In particular, it is noted that an impedance of the capacitor C42 is dependent upon the frequency of the output E of the square wave generator, in an analogous manner to that of the capacitor described with reference to Equation 1. In this way, a voltage at point F is dependent upon the frequency of the output E of the square wave generator. Thus, the voltage at point F is a control signal.

The voltage at point F leads to a voltage change at point G. Point G is connected to the first reference voltage $V_{HIGH}$ (i.e. the base of transistor Q4B). Thus a change in the frequency of the alternating power supply leads to a change in the first reference voltage $V_{HIGH}$. In turn, this affects the shunt duration time.

By way of explanation, when a voltage at point E is high, diodes D15 and D16 are conducted and capacitor C42 is charged; When a voltage at point E voltage is low, diode D15 is off and diode D16 is conducted, such that C42 is discharged. When the ballast frequency is changed, G point voltage is changed and $V_{HIGH}$ will change too. Filtering capacitor C41 is provided to mitigate high frequency ripple and ensure a voltage at point E is stable.

In particular, as the frequency of the electronic ballast is changed (e.g. due to a switching of an input impedance of the interface circuit), the first reference voltage $V_{HIGH}$ may be tuned according to the frequency such that a shunt of the input terminal continues to occur in each half-cycle of the ballast output. This prevents some half-cycles of the electronic ballast being unintentionally bypassed and causing an error.

When the effective frequency of the electronic ballast is increased (e.g. caused by a variance in an input impedance or a change in a frequency of the electronic ballast), the first reference voltage may be increased. When the frequency of the electronic ballast is decreased, the first reference voltage may correspondingly be decreased. Thus, the control signal may tune the first reference voltage $V_{HIGH}$.

A similar circuit or arrangement may be used to bias or control the second reference voltage $V_{LOW}$. In particular, a value of the second reference voltage may be increased in response to the ballast frequency increasing, and decreased in response to the ballast frequency decreasing.

Table 1 illustrates the effect of introducing the compensating circuit and the frequency compensating circuit to the interface circuit. In particular, a 20% improvement in frequency compatibility can be realized when introducing the compensating circuit, and a 45% improvement can be realized when introducing the frequency compensating circuit.

TABLE 1

| Ballast compatible frequency range | Min(kHz) | Max(kHz) |
|---|---|---|
| Conventional Circuit | 50 | 75 |
| With Compensating Circuit of FIG. 10 | 40 | 90 |
| With Compensating Circuit of FIG. 11 | 40 | 110 |

It will be readily apparent that an interface circuit including the compensating circuit and the frequency compensating circuit may be compatible with a wider range of ballast frequencies. Similarly, an interface circuit comprising only one of these circuits is also compatible with a wider range of ballast frequencies.

Figure 12:
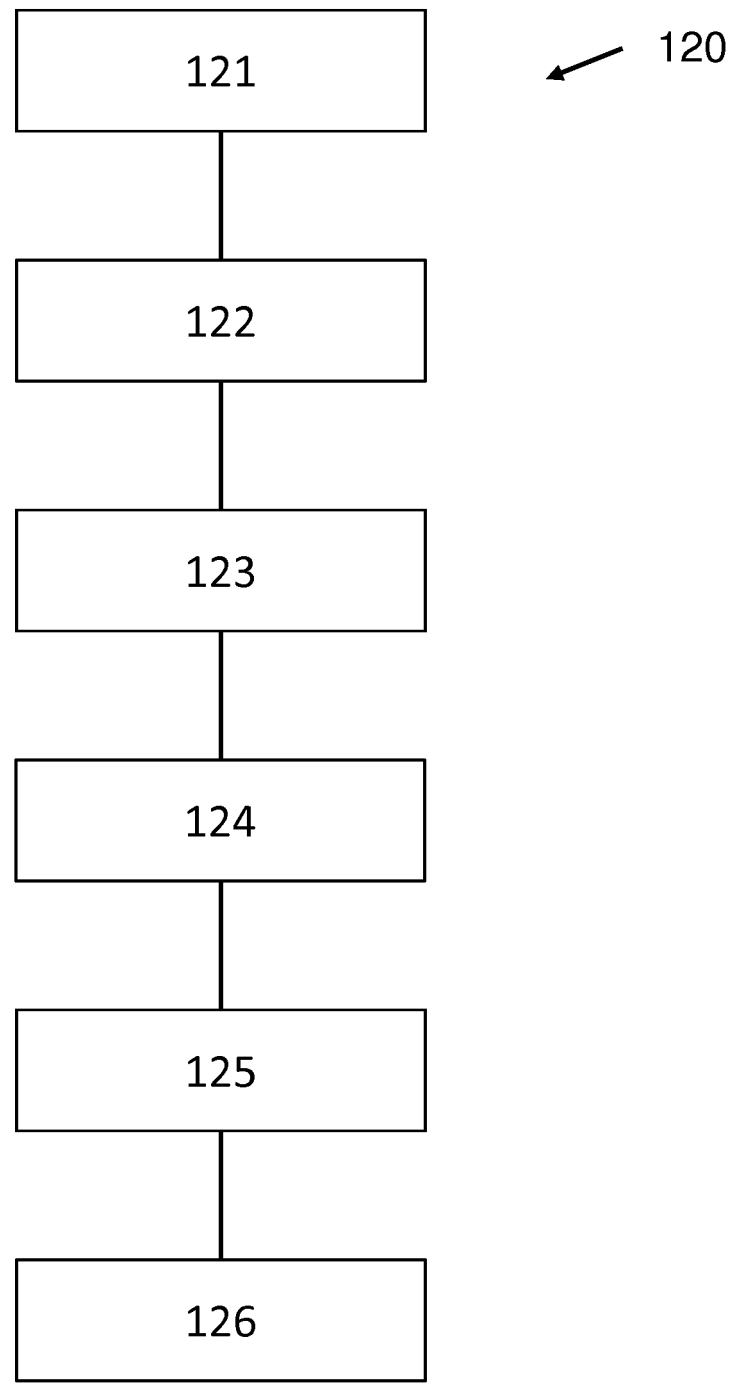
FIG. 12 is a flow diagram of a method according to an embodiment.

FIG. 12 is a flowchart illustrating a method 120 of operating a lighting arrangement with an electronic ballast, adapted to output an alternating power supply, the method comprising: coupling 121 to the electronic ballast; coupling 122 to the lighting arrangement; generating 123 a control signal corresponding to a frequency of the alternating power supply received at the input terminal; obtaining 124 a desired lighting level of the lighting arrangement; adjusting 125, using a shunt arrangement, a coupling configuration of the electronic ballast and the lighting arrangement; and controlling 126, during each cycle of the alternating power supply, the shunt arrangement based on at least the control signal and the desired lighting level.

Other variations to the disclosed embodiments can be understood and effected by those skilled in the art in practicing the claimed invention, from a study of the drawings, the disclosure, and the appended claims. In the claims, the word 'comprising' does not exclude other elements or steps, and the indefinite article 'a' or 'an' does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An interface circuit for coupling an electronic ballast, which ballast is adapted to output an alternating power supply, to a lighting arrangement, the interface circuit comprising:
an input terminal connectable to the electronic ballast;
an output terminal connectable to the lighting arrangement;
a shunt arrangement adapted to controllably adjust a coupling configuration between the input terminal and the output terminal; and
a current feedback control loop adapted to detect a current (CS) flowing through the lighting arrangement and regulate the current (CS) flowing through the lighting arrangement by controlling the shunt duration of the shunt arrangement;
characterized in that the interface circuit further comprises:
a detection arrangement adapted to detect a frequency of the alternating power supply received at the input terminal;
a control arrangement adapted to control the length of the shunt duration of the shunt arrangement during each cycle of the alternating power supply based on the detected frequency, so as to control a duty cycle of the alternating power supply provided to the output terminal or a duty cycle of not short circuiting the electronic ballast based on the detected frequency;
wherein the current feedback control loop is different from controlling the length of the shunt duration based on the detected frequency;
wherein the electronic ballast is a ballast for fluorescent lamps,
the interface circuit further comprising a dimming circuit adapted to obtain a desired lighting level of the lighting arrangement from a dimmer,
the control arrangement is further adapted to, during each cycle of the alternating power supply, control the coupling configuration of the shunt arrangement based on the desired lighting level;
wherein the detection arrangement comprises a detection circuit, adapted to detect the duty cycle of the alternating power supply provided to the output terminal or the duty cycle of not short circuiting the electronic ballast; and
a comparing circuit, adapted to compare a present duty cycle and a previous duty cycle, and output a control signal if the present duty cycle deviates from the previous duty cycle by a certain ratio meanwhile the lighting level has not been changed at the dimming circuit.

2. The interface circuit of claim 1, wherein the desired lighting level comprises a dimming level of the lighting arrangement,
the control arrangement is adapted to, for a particular desired lighting level, maintain the duty cycle substantially constant, for different frequencies of the alternating power supply received at the input terminal, and
the current feedback control loop is adapted to:
increase the shunt duration so as to reduce the current (CS) flowing through the lighting arrangement if the current (CS) flowing through the lighting arrangement is too large with respect to the dimming level (DIM);
wherein said control arrangement has a response time, for controlling the length of the shunt duration based on the detected frequency, comparable with respect to a speed of a variance in the different frequencies of the alternating power supply, and said current feedback control loop has a response time substantially slower with respect to the speed of the variance in the different frequencies of the alternating power supply.

3. The interface circuit of claim 1, wherein the detection arrangement comprises a control capacitor adapted to output a signal corresponding to the frequency of the alternating power supply.

4. The interface circuit of claim 3, wherein the detection arrangement further comprises a square wave generator adapted to generate a square wave based on the alternating power supply and having the same frequency as the alternating power supply, wherein the square wave is provided to the control capacitor.

5. The interface circuit of claim 1, wherein the control arrangement comprises:
a variable input impedance connected to the input terminal; and
an input control arrangement adapted to control the variable input impedance based on an ON/OFF command;
the detection arrangement is adapted to generate the detected frequency based on the ON/OFF command; and
the control arrangement is adapted to control the shunt arrangement to operate in synchronization with half cycles of the alternating power supply.

6. The interface circuit of any of claim 5, wherein the variable input impedance comprises at least one variable capacitance,
   the control arrangement is adapted to control the coupling configuration of the shunt arrangement based on a difference between a first reference voltage and a second reference voltage, wherein the interface circuit further comprises:
   an compensation circuit adapted to tune at least one of the first reference voltage and the second reference voltage based on the detected frequency.

7. The interface circuit of claim 6, further comprising a control capacitor adapted to output the detected frequency of the alternating power supply, wherein the compensation circuit is adapted to tune the first reference voltage dependent upon the detected frequency.

8. The interface circuit of claim 6, further comprising:
   a capacitor connected so as to be alternatively charged and discharged by the alternating power supply;
wherein the control arrangement is adapted to control the coupling configuration of the shunt arrangement based on a voltage across the capacitor,
wherein during a charging phase of the capacitor:
   if a voltage across the capacitor is below the first reference voltage, the control arrangement is adapted to configure the coupling configuration such that current is unable to flow from the input terminal to the output terminal if the shunt arrangement; and
   if the voltage across the capacitor is at or above the first reference voltage, the control arrangement is adapted to configure the decoupling configuration such that current is able to flow from the input terminal to the output;
and wherein during a discharging phase of the capacitor:
   if the voltage across the capacitor is above the second reference voltage, the control arrangement is adapted to configure the coupling configuration such that current is unable to flow from the input terminal to the output terminal if the shunt arrangement; and
   if the voltage across the capacitor is at or below the second reference voltage, the control arrangement is adapted to configure the decoupling configuration such that current is able to flow from the input terminal to the output;
wherein said compensation circuit is adapted to perform at least one of the following:
   decrease the first reference voltage in response to an increase in the frequency of the alternating power supply; and/or increase the second reference voltage in response to an increase in the frequency of the alternating power supply.

9. The interface circuit of claim 6, further comprising:
   a second reference voltage generator adapted to output the second reference voltage based on a comparison between:
   a signal corresponding to the desired lighting level of the light arrangement; and
   one or more of the following:
      a first feedback signal corresponding to a current passing through the light arrangement; and
      a second feedback signal corresponding to the voltage across the light arrangement;
   wherein the comparator is adapted to switch between the first feedback signal and the second feedback signal in response to an ON/OFF command;
and wherein the compensation circuit is adapted to change the first reference voltage according to the ON/OFF command.

10. An LED lamp, comprising the interface circuit of claim 1, and one or more LEDs as the lighting arrangement.

11. An interface circuit for coupling an electronic ballast, which ballast is adapted to output an alternating power supply, to a lighting arrangement, the interface circuit comprising:
   an input terminal connectable to the electronic ballast;
   an output terminal connectable to the lighting arrangement;
   a shunt arrangement adapted to controllably adjust a coupling configuration between the input terminal and the output terminal; and
   a current feedback control loop adapted to detect a current (CS) flowing through the lighting arrangement and regulate the current (CS) flowing through the lighting arrangement by controlling the shunt duration of the shunt arrangement;
   characterized in that the interface circuit further comprises:
   a detection arrangement adapted to detect a frequency of the alternating power supply received at the input terminal;
   a control arrangement adapted to control the length of the shunt duration of the shunt arrangement during each cycle of the alternating power supply based on the detected frequency, so as to control a duty cycle of the alternating power supply provided to the output terminal or a duty cycle of not short circuiting the electronic ballast based on the detected frequency;
   wherein the current feedback control loop is different from controlling the length of the shunt duration based on the detected frequency;
   wherein the electronic ballast is a ballast for fluorescent lamps,
   the interface circuit further comprising a dimming circuit adapted to obtain a desired lighting level of the lighting arrangement from a dimmer,
   the control arrangement is further adapted to, during each cycle of the alternating power supply, control the coupling configuration of the shunt arrangement based on the desired lighting level;
   wherein the control arrangement comprises,
      a timing capacitor, wherein a voltage across the timing capacitor determines a coupling configuration of the shunt arrangement;
      a fixed current source connected to the timing capacitor to provide a fixed charge current to the timing capacitor; and
      a variable current source connected to the timing capacitor, wherein the variable current source is adapted to provide an additional charge current to the timing capacitor based on the detected frequency, so as to vary a rate of charging the timing capacitor based on the detected frequency of the alternating power supply provided at the input terminal.

12. The interface circuit of claim 11, wherein the magnitude of the additional charge current is proportional to the frequency of the alternating power supply, and/or the control arrangement further comprises:
   a voltage threshold element, adapted to set a voltage threshold according to said desired lighting level;

and said control arrangement is adapted to trigger a decoupling configuration of the shunt arrangement when the voltage on the timing capacitor reaching the voltage threshold.

13. The interface circuit of claim 12, wherein the variable input impedance is adapted to be switched between:
  a first impedance state having a first impedance; and
  a second impedance state having a second, greater impedance than the first impedance,
and wherein the input control arrangement is adapted to switch the variable input impedance between the first impedance state and the second impedance state based on an ON/OFF command, and the detection arrangement is adapted to generate the detected frequency in synchronization with a switching of the variable input impedance.

* * * * *